US012695390B2

(12) United States Patent
Fukuno et al.

(10) Patent No.: US 12,695,390 B2
(45) Date of Patent: Jul. 28, 2026

(54) ELECTRIC POWER CONVERSION APPARATUS WITH PHASE DIFFERENCE ERROR COMPENSATION

(71) Applicant: Mitsubishi Electric Corporation, Tokyo (JP)

(72) Inventors: Kenichi Fukuno, Tokyo (JP); Takaharu Ishibashi, Tokyo (JP); Takato Toi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 363 days.

(21) Appl. No.: 18/548,255

(22) PCT Filed: Apr. 26, 2021

(86) PCT No.: PCT/JP2021/016582
    § 371 (c)(1),
    (2) Date: Aug. 29, 2023

(87) PCT Pub. No.: WO2022/230005
    PCT Pub. Date: Nov. 3, 2022

(65) Prior Publication Data
    US 2024/0136935 A1    Apr. 25, 2024
    US 2024/0235404 A9    Jul. 11, 2024

(51) Int. Cl.
    *H02M 3/335*    (2006.01)
    *H02M 1/32*    (2007.01)

(52) U.S. Cl.
    CPC ......... *H02M 3/33584* (2013.01); *H02M 1/32* (2013.01); *H02M 3/3353* (2013.01); *H02M 3/33573* (2021.05)

(58) Field of Classification Search
    CPC ............ H02M 3/22; H02M 3/24; H02M 3/28; H02M 3/315; H02M 3/3155; H02M 3/325;
    (Continued)

(56) References Cited

U.S. PATENT DOCUMENTS 10,897,211 B2 *    1/2021    Mizokami ........... H02M 3/3376
2017/0358996 A1    12/2017    Higaki et al.
(Continued)

FOREIGN PATENT DOCUMENTS

JP    2010146967 A    7/2010
WO    2016125374 A1    8/2016
WO    2019008854 A1    1/2019
WO    2019039489 A1    2/2019

OTHER PUBLICATIONS

Notice of Reasons for Refusal dated Jul. 2, 2024, issued in the corresponding Japanese Patent Application No. 2023-516862, 12 pages including 6 pages of English Translation.
(Continued)

*Primary Examiner* — Thienvu V Tran
*Assistant Examiner* — Carlos O Rivera-Perez
(74) *Attorney, Agent, or Firm* — BUCHANAN, INGERSOLL & ROONEY PC

(57) ABSTRACT

An electric power conversion apparatus according the present disclosure includes: voltage detectors which detect the voltages of both bridge circuits, and a control device which controls the semiconductor switching elements of both bridge circuits. The control device includes a phase difference operation part which calculates a phase difference between the output of the first bridge circuit and the output of the second bridge circuit, based on the voltage values of both bridge circuits which are detected by the voltage detectors and an electric power command value; a compensation amount operation part which calculates a compensation amount which compensates an error due to the phase difference; and a PWM signal generation part which generates gate signals of the semiconductor switching elements, from a first operation result of the phase difference operation part and a second operation result of the compensation amount operation part.

9 Claims, 17 Drawing Sheets

(58) Field of Classification Search

CPC ............... H02M 3/335; H02M 3/3353; H02M 3/33538; H02M 3/335846; H02M 3/33553; H02M 3/33569; H02M 3/33571; H02M 3/33573; H02M 3/33576; H02M 3/33584; H02M 3/33592; H02M 1/0003; H02M 1/0009; H02M 1/0016; H02M 1/0019; H02M 1/0022; H02M 1/0025; H02M 1/0043; H02M 1/0054; H02M 1/0058; H02M 1/32; H02M 1/38; H02M 1/08; H02M 1/083

USPC ...... 363/15–21.11, 40–43, 48, 50, 56.04, 74, 363/79, 89, 95, 97, 98, 118, 123, 124, 363/125, 127, 131–132; 323/212, 215, 323/217, 219, 235, 237, 238, 266, 323/271–277, 280, 282–285, 299, 300, 323/319, 320, 321, 351

See application file for complete search history.

(56) References Cited

U.S. PATENT DOCUMENTS

| | | |
|---|---|---|
| 2020/0274457 A1 | 8/2020 | Kajiyama et al. |
| 2020/0366198 A1 | 11/2020 | Watanabe et al. |

OTHER PUBLICATIONS

Decision of Refusal dated Oct. 8, 2024, issued in the corresponding Japanese Patent Application No. 2023-516862, 8 pages including 4 pages of English Translation.

Notice of Reasons for Refusal dated Jan. 7, 2025, issued in the corresponding Japanese Patent Application No. 2023-516862, 6 pages including 3 pages of English Translation.

International Search Report (PCT/ISA/210) with translation and Written Opinion (PCT/ISA/237) Mailed on Jul. 6, 2021, by the Japan Patent Office as the International Searching Authority for International Application No. PCT/JP2021/016582. (9 pages).

Office Action dated Aug. 27, 2025, issued in the corresponding German Patent Application No. 112021007583.7, 8 pages including 4 pages of English Translation.

Bai, et al., "A Model-Based Dead-Band Compensation for the Dual-Active-Bridge Isolated Bidirectional DC-DC Converter", IEEE Transactions on Electrical and Electronic Engineering, vol. 6, 2011, pp. 517-524.

Hu, et al., "A Comprehensive Dead-Time Compensation Method for a Three-Phase Dual-Active Bridge Converter with Hybrid Modulation Schemes", International Power Electronics Conference (IPEC), 2018, pp. 1073-1079.

Itoh, et al., "Dead-time Compensation with DC Offset Current Elimination Method Using Three-level Operation for Dual Active Bridge DC-DC Converter", IEEE Energy Conversion Congress and Exposition (ECCE), 2018, pp. 6299-6306.

Itoh, et al., "Non-linear Dead-time Error Compensation Method of Dual Active Bridge DC-DC Converter for Variable DC-bus Voltage", International Conference on Smart Grid (icSmartGrid), 2018, pp. 208-213.

Song, et al., "Dead-Time Effect Analysis of Dual Active Bridge DC-DC Converter with Dual-Phase-Shift Control", Chinese Automation Congress (CAC), 2017, pp. 6545-6550.

Takagi, et al., "Dynamic Control and Dead-time Compensation Method of an Isolated Dual-Active-Bridge DC-DC Converter", 17th European Conference on Power Electronics and Applications (EPE'15 ECCE—Europe), 2015, 10 pages.

* cited by examiner

ELECTRIC POWER CONVERSION APPARATUS WITH PHASE DIFFERENCE ERROR COMPENSATION

TECHNICAL FIELD

The present disclosure relates to an electric power conversion apparatus.

BACKGROUND ART

This electric power conversion apparatus is an insulated type DC/DC converter, and is, in particular, intended for a DC/DC converter which transmits electric power in both directions between two direct current terminals. A bidirectional insulated type DC/DC converter includes two sets of full bridge circuits, which are connected at the primary side and the secondary side of an insulated transformer. Each of the full bridge circuits is by a bridge circuit which is equipped with two or more semiconductor switching elements. In the bidirectional insulated type DC/DC converter, it is desired that the transmission of electric power can be performed in a wide voltage range with a simple circuit configuration, and highly reliable output control can be performed, without the deterioration of controllability in a step up operation domain, owing to a short circuit prevention period.

For this reason, a converter is proposed to eliminate the inability to perform a step up operation (for example, Patent Document 1). Here, DUTY ratios are calculated based on transmission electric power and a command value, and each of the semiconductor switching elements is drive controlled. In addition, a semiconductor switching element in one bridge circuit is set as a first standard element. The phase shift amount between the drive signal of the first standard element and the drive signal of a first diagonal element is set as a first phase shift amount, where the first diagonal element is a semiconductor switching element having a diagonal relation with the first standard element. Further, a semiconductor switching element in the other bridge circuit is set as a second standard element. The phase shift amount between the drive signal of a second diagonal element and the drive signal of the first standard element is set as a second phase shift amount, where the second diagonal element is a semiconductor switching element having a diagonal relation with the second standard element. When a step up operation is carried out, the second phase shift amount is controlled so as to become larger than the first phase shift amount, and to exceed the short circuit prevention period in each of the full bridge circuits, irrespective of the DUTY ratios.

CITATION LIST

Patent Literature

Patent Document 1: WO 2016/125374

SUMMARY OF THE INVENTION

Problem to be Solved by the Invention

The DC/DC converter which is proposed in the Patent Document 1 is assumed to be applied to a system which performs the transmission of electric power, in a state where the relation between the DC voltage of a first direct current terminal and the DC voltage of a second direct current terminal is different from the turn ratio of a transformer.

However, step up operation or step down operation is not assumed in the converter. Further, no description is found about the transmission of electric power which is performed when the relation between the DC voltage of a first direct current terminal and the DC voltage of a second direct current terminal is equal to the turn ratio of a transformer.

Moreover, when the electric power for transmission is small, the first phase shift amount and the second phase shift amount are reduced in size to match the electric power for transmission with a command value, but the lower limit value of the phase shift amount is limited to a short circuit prevention period in each of the bridge circuits. Thereby, there is a limit to reducing the first phase shift amount and the second phase shift amount. As a result, it is probable that a large amount of electric power which is different from the command value may be transmitted.

In such a case, an uncontrollable operation domain is generated in the DC/DC converter, and then, may cause the deterioration of control performance.

The present disclosure is made to solve the problems mentioned above, and aims at offering an electric power conversion apparatus which can achieve operations independent on the DC voltage of the first direct current terminal, the DC voltage of the second direct current terminal, and the turn ratio of a transformer, and furthermore, can generate a phase shift amount for controlling the electric power for transmission, which is not affected by the influence of a short circuit prevention period.

Means to Solve the Problem

An electric power conversion apparatus, which is disclosed in the present application includes:

a transformer, a first bridge circuit, having a first semiconductor switching element, connected to a primary side winding of the transformer, and being set up with a short circuit prevention period, a second bridge circuit, having a second semiconductor switching element, connected to a secondary side winding of the transformer, and being set up with a short circuit prevention period, first voltage detection means, detecting a first voltage input into the first bridge circuit, second voltage detection means, detecting a second voltage input into the second bridge circuit, and a control device, controlling the first semiconductor switching element and the second semiconductor switching element, wherein the control device comprises:

a phase difference operation part which calculates a phase difference between a first output of the first bridge circuit and a second output of the second bridge circuit, based on a first voltage value detected by the first voltage detection means, a second voltage value detected by the second voltage detection means, and an electric power command value, a compensation amount operation part which calculates a compensation amount for compensating an error caused in the phase difference, from a first operation result of the phase difference operation part, the first voltage value, and the second voltage value, and a PWM signal generation part which generates a first gate signal of the first semiconductor switching element, and a second gate signal of the second semiconductor switching element, from the first operation result of the phase difference operation part and a second operation result of the compensation amount operation part.

Effects of the Invention

According to the electric power conversion apparatus of the present disclosure, it becomes possible to transmit electric power which is in alignment with a command value of electric power, without suffering from the influence of a short circuit prevention period.

BRIEF EXPLANATION OF THE DRAWINGS

FIG. 1 is a configuration diagram of the electric power conversion apparatus according to the Embodiment 1.

FIG. 3 is a first explanatory diagram of charge operations of the electric power conversion apparatus according to the Embodiment 1.

FIG. 4 is a second explanatory diagram of charge operations of the electric power conversion apparatus according to the Embodiment 1.

FIG. 6 is a diagram for explaining charge operations of the electric power conversion apparatus according to the Embodiment 1.

FIG. 9 is a diagram for explaining charge operations of the electric power conversion apparatus according to the Embodiment 2.

FIG. 15 is a configuration diagram of the electric power conversion apparatus according to the Embodiment 5.

DESCRIPTION OF EMBODIMENTS

Figure 2:
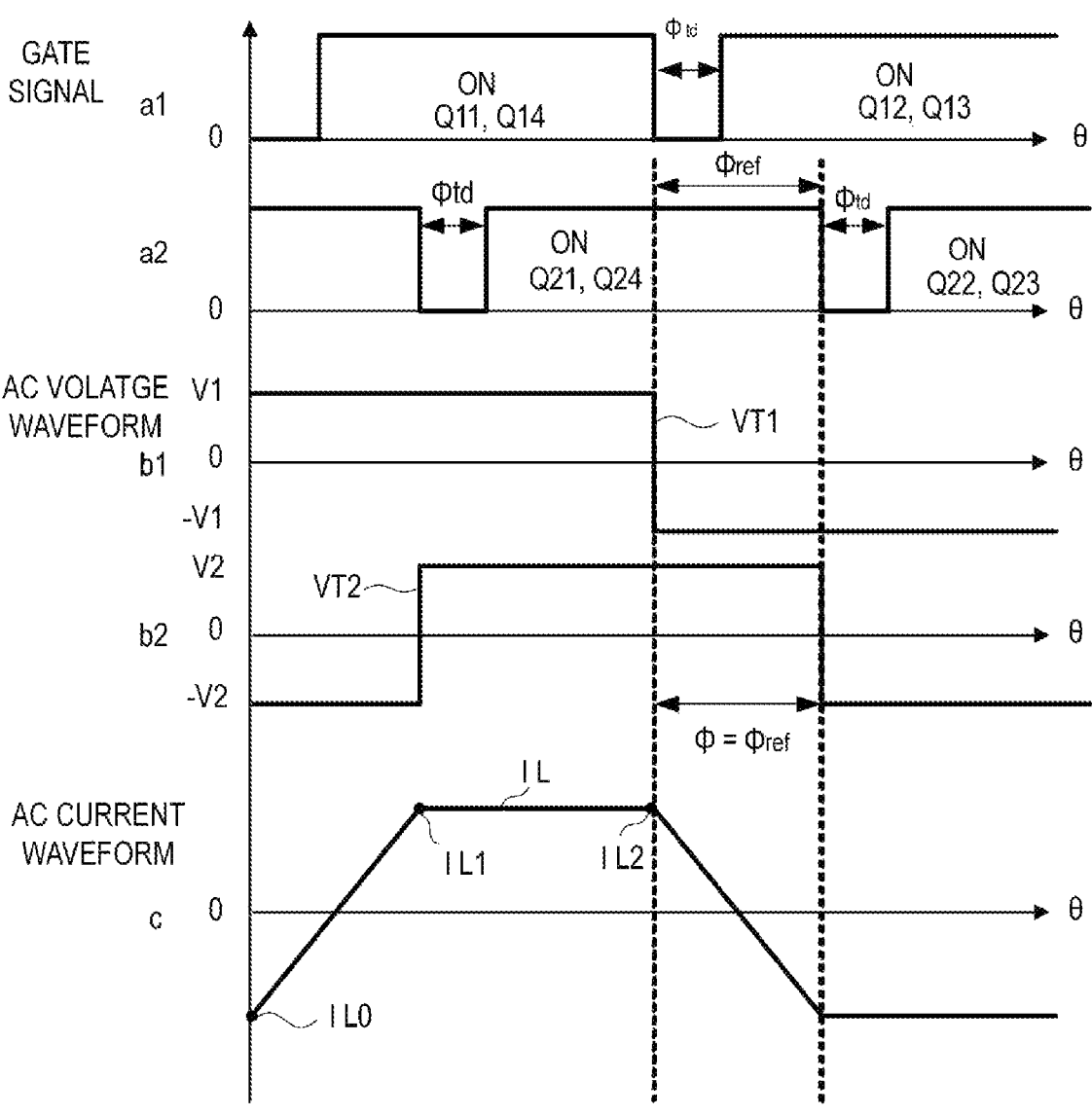
FIG. 2 is a first waveform chart showing an AC current and voltages which are applied to a transformer winding, according to the Embodiment 1.

Hereinafter, the embodiments of electric power conversion apparatus will be explained in detail based on drawings. It is worth noticing that, the same symbols in the drawings show the same or corresponding portions.

Embodiment 1

In the Embodiment 1, explanation will be made about an electric power conversion apparatus, which transmits electric power from one direct current terminal to the other direct current terminal. The electric power conversion apparatus is a DC/DC converter having two sets of bridge circuits and a transformer equipped with two windings.

Figure 1:
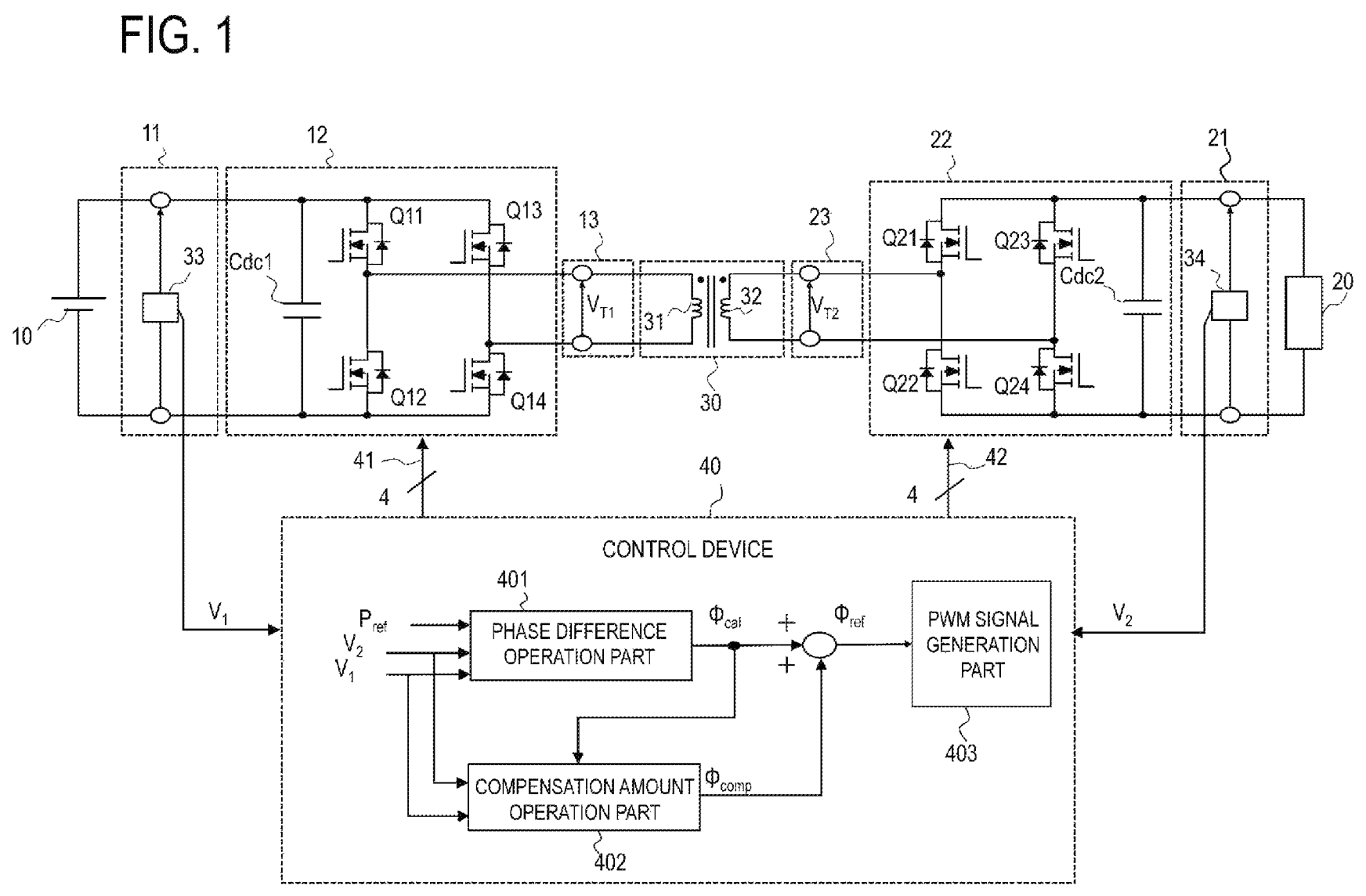

FIG. 1 is a circuit diagram showing the configuration of the electric power conversion apparatus, according to the Embodiment 1 of the present disclosure.

As shown in FIG. 1, the electric power conversion apparatus 1 is equipped with a first bridge circuit 12 which is connected to a first direct current terminal 11, receiving DC electric power from a direct current power supply 10, a second bridge circuit 22 which is connected to a second direct current terminal 21, and a transformer 30.

The first bridge circuit 12 has a direct current capacitor Cdc1 which is connected in parallel with the first direct current terminal 11, and two switching legs which comprise series connected semiconductor switching elements Q11-Q14, where those semiconductor switching elements are referred to as semiconductor devices at an anode side and semiconductor devices at a cathode side.

The second bridge circuit 22 has a direct current capacitor Cdc2 which is connected in parallel with the second direct current terminal 21, and two switching legs which comprise series connected semiconductor switching elements Q21-Q24, where those semiconductor switching elements are referred to as semiconductor devices at an anode side and semiconductor devices at a cathode side.

In the first bridge circuit 12, each middle connecting point of the switching legs is connected with the primary side winding 31 of the transformer 30. In the second bridge circuit 22, each middle connecting point of the switching legs is connected with the secondary side winding 32 of the transformer 30.

The electric power conversion apparatus 1 is a circuit, which converts the voltage V1 of the first direct current terminal 11 into the voltage V2 which is applied to the second direct current terminal 21, via the first bridge circuit 12, the transformer 30, and the second bridge circuit 22. In addition, the electric power conversion apparatus can control the bidirectional conversion of electric power freely.

The voltage V1 of the first direct current terminal 11 is detected by the first voltage detection means 33. Moreover, the voltage V2 of the second direct current terminal 21 is detected by the second voltage detection means 34.

It is assumed that, the one whose output voltage fluctuates like a Photo Voltaic panel (PV) or a storage battery will be connected as a direct current power supply. Furthermore, a case is also assumed where AC electric power is converted into direct current with an AC/DC converter. Moreover, it is assumed that, the one whose voltage fluctuates like a storage battery will be connected in the load 20. Furthermore, the load is assumed to be an AC load, such as a motor, which is connected through a DC/AC converter, or LEDs and the like which are connected through a DC/DC converter.

As the semiconductor switching elements Q11-Q24, a semiconductor switching element with self-extinguishing function, is used, for example, an IGBT (Insulated Gate Bipolar Transistor) or a MOSFET (Metal Oxide Semiconductor Field Effect), connected in reverse parallel with a diode. In some embodiments, two or more semiconductor switching elements, which are combined in parallel, may be used as each of the semiconductor switching elements Q11-Q24, according to the current capacity.

A control device 40 generates a gate signal 41 and a gate signal 42, which will be sent to the semiconductor switching elements Q11-Q24, in the first bridge circuit 12 at the power supply side and in the second bridge circuit 22 at the load side. Further, the control device controls the switching of each of the semiconductor switching elements Q11-Q24. Since the control device controls the switching of each of the semiconductor switching elements Q11-Q24, the first bridge circuit 12 outputs an AC voltage VT1 to the primary side winding 31 of the transformer 30, and the second bridge circuit 22 outputs an AC voltage VT2 to the secondary side winding 32 of the transformer 30.

In this case, each of the semiconductor switching elements Q11-Q24 can perform zero voltage switching (ZVS) motion, or soft switching, by the action of inductance elements between the first bridge circuit 12 and the transformer 30, or between the second bridge circuit 22 and the transformer 30.

In this case, each of the semiconductor switching elements Q11-Q24 carries out the soft switching, and thereby, switching losses can be reduced. Further, the frequency of operation can be increased, and the size reduction of the transformer 30 can be achieved.

It is worth noticing that, the soft switching is a technology for reducing the current or the voltage applied to the semiconductor switching elements Q11-Q24, during a switching transition period, and performing the reduction of switching losses and electromagnetism noises. Moreover, in some embodiments, the leak inductance of the transformer 30 may be used as an inductance element.

Moreover, electrolytic condensers or film capacitors are used for the DC capacitors Cdc1 and Cdc2. High frequency currents flow into the DC capacitors Cdc1 and Cdc2. When a film capacitor is used, degradation due to the high frequency current can be restrained and extension of service life can be attained.

It is worth noticing that, in FIG. 1, the direction of an arrow is set as positive.

As shown in FIG. 1, the control device 40 in accordance with the Embodiment 1 is equipped with a phase difference operation part 401, a compensation amount operation part 402, and a PWM signal generation part 403.

The first bridge circuit 12 outputs an AC voltage VT1 to the primary side winding 31 of the transformer 30, and the second bridge circuit 22 outputs an AC voltage VT2 to the secondary side winding 32 of the transformer 30. Based on the DC voltage V1 which is detected by the first voltage detection means 33, and an electric power command value P ref, the phase difference operation part 401 calculates a phase difference $\varphi$cal, between the AC voltage VT1 and the AC voltage VT2.

The compensation amount operation part 402 calculates a compensation amount required for the compensation of an error which is caused by the phase difference at the AC voltages VT1 and VT2, applied to primary winding 31 and secondary winding 32 of transformer 30 during the short-circuit prevention period. When calculating a compensation amount, the compensation amount operation part calculates a compensation amount $\varphi$comp, from the DC voltage V1 which is detected by the first voltage detection means 33, the DC voltage V2 which is detected by the second voltage detection means 34, and the phase difference $\varphi$cal, which is a result calculated in the phase difference operation part 401.

Moreover, from the DC voltage V1 which is detected by the first voltage detection means 33, the DC voltage V2 which is detected by the second voltage detection means 34, and the phase difference which is calculated in the phase difference operation part 401, the compensation amount operation part 402 calculates currents just before the semiconductor switching elements Q11-Q24 are turned on, where those currents are in the first bridge circuit 12 and the second bridge circuit 22. In addition, from these calculated currents, the compensation amount operation part 402 judges whether or not ZVS motion can be attained in the first bridge circuit 12 and the second bridge circuit 22.

When the ZVS motion is not attained in the bridge circuit at a load side, between the first bridge circuit 12 and the second bridge circuit 22, the compensation amount operation part 402 outputs a phase amount, which is equivalent to a short circuit prevention period, having a reversed polarity to the phase difference calculated in the phase difference operation part 401. Moreover, when the ZVS motion is not be attained in the bridge circuit at a power supply side, between the first bridge circuit 12 and the second bridge circuit 22, the compensation amount operation part 402 outputs a phase amount, which is equivalent to a short circuit prevention period, having the same polarity with the phase difference calculated in the phase difference operation part 401.

The phase difference which is the sum of a phase difference $\varphi$cal, calculated in the phase difference operation part 401, and a compensation amount $\varphi$comp, calculated in the compensation amount operation part 402, is referred to as a phase difference command value $\varphi$ref. The PWM signal generation part 403 generates the gate signals 41 and 42 of the semiconductor switching elements Q11-Q24, based on this phase difference command value $\varphi$ref.

In FIG. 2, the gate signals of the semiconductor switching elements Q11-Q24 are shown as the signal a1 and the signal a2, in accordance with the Embodiment 1. The first bridge circuit 12 and the second bridge circuit 22 output an AC voltage VT1 and an AC voltage VT2, to the primary side winding 31 and the secondary side winding 32 of the transformer 30. The waveforms of the AC voltage VT1 and the AC voltage VT2 are shown as the waveform b1 and the waveform b2, and the waveform of the AC current IL is shown as the waveform c. It is worth noticing that, in FIG. 2, the symbol $\varphi$td is a short circuit prevention period, and the symbol $\varphi$ref is a phase difference command value which is generated within the control device 40, and the symbol $\varphi$ is a phase difference between the actual AC voltage VT1 and AC voltage VT2.

When the operation frequency of the semiconductor switching elements Q11-Q24 is increased to a higher frequency (for example, 61 Hz or more), in order to reduce the size of the transformer 30, the loss of the transformer 30 increases. The increase in a loss due to a higher frequency can be controlled by employing amorphous (amorphous) material, or a silicon steel plate whose silicon content is 6.5%, or a silicon steel plate whose board thickness is about 0.1 mm, as an iron core material.

As shown in FIG. 2, there is a phase difference $\varphi$, between the AC voltage VT1 which the first bridge circuit 12 outputs and the AC voltage VT2 which the second bridge circuit 22 outputs. In the electric power conversion apparatus 1 of FIG. 1, the phase difference $\varphi$ is controlled to regulate the transmission of electric power. Electric power is transmitted from a phase difference advanced side to a phase difference delayed side.

For example, in the case of FIG. 2, electric power is transmitted from the first bridge circuit 12 at a power supply side to the second bridge circuit 22 at a load side, since the phase of the AC voltage VT1 is advanced with respect to the AC voltage Vt2. The electric power P which will be transmitted from the direct current power supply 10 to the load 20 can be obtained by the following Equation (1).

[Eq. 1]

Eq. 1

$$P = \frac{V_1 V_2}{2\pi f_{sw} L} \phi \left(1 - \frac{\phi}{\pi}\right) \tag{1}$$

It is worth noticing that, in the Equation (1), the symbol fsw is the switching frequency of the semiconductor switching elements Q11-Q24, and the symbol L is a total value of all the inductance elements contained in a current pathway which AC current passes, including the leak inductance between the primary side winding 31 and the secondary side winding 32. It is worth noticing that, in this inductance element, the inductance of a wiring and a parasitic inductance contained in the semiconductor switching elements are ignored in general. Mainly, the inductance L indicates the inductance which is connected in series to the transformer 30.

Moreover, the symbol V2 is a voltage value which is converted into a value, viewed from the primary side winding 31 of the transformer 30.

Furthermore, as electric power P is transmitted to the load 20, AC current IL flows inside of the first bridge circuit 12 and the second bridge circuit 22. Regarding the AC current IL, AC current IL0, AC current IL1, and AC current IL2 at changing points can be calculated from the following Equations (2), (3), and (4).

[Eq. 2]

Eq. 2

$$I_{L0} = \frac{1}{2}[(A - B)\phi + B(\pi - \phi)] \tag{2}$$

[Eq. 3]

Eq. 3

$$I_{L1} = I_{L0} + A\phi \tag{3}$$

[Eq. 4]

Eq. 4

$$I_{L2} = I_{L1} + B(\pi - \phi) \tag{4}$$

However, in the Equation (2) to the Equation (4), the symbol A and the symbol B are derived from the Equation (5).

[Eq. 5]

Eq. 5

$$A = \frac{V_1 + V_2}{2\pi f_{sw} L}, \ B = \frac{V_1 - V_2}{2\pi f_{sw} L} \tag{5}$$

Moreover, the transformation of Equation (1) leads to the following Equation (6). The phase difference φ for controlling electric power is obtained using the Equation (6), in the phase difference operation part 401 of the control device 40.

[Eq. 6]

Eq. 6

-continued $$\phi_{cal} = \frac{\pi}{2} - \sqrt{\left(\frac{\pi}{2}\right)^2 - \frac{2\pi^2 f_{sw} LP}{V_1 V_2}} \tag{6}$$

Moreover, using the Equation (1), the phase difference φ can be obtained approximately also from the Equation (7), which is shown below.

[Eq. 7]

Eq. 7

$$\phi_{cal} = \frac{2\pi f_{sw} LP}{V_1 V_2} \tag{7}$$

When the phase difference φ is calculated simply from the Equation (7), it becomes possible to reduce the calculation load of the phase difference operation part 401, and constitute the control device 40 more cheaply. Here, when there is no compensation amount operation part 402 in the control device 40, a calculation result φcal of the phase difference operation part 401 will be input as a phase difference command value φref, in the PWM signal generation part 403, and each of the gate signals 41 and 42 is generated in the PWM signal generation part 403.

Figure 3:
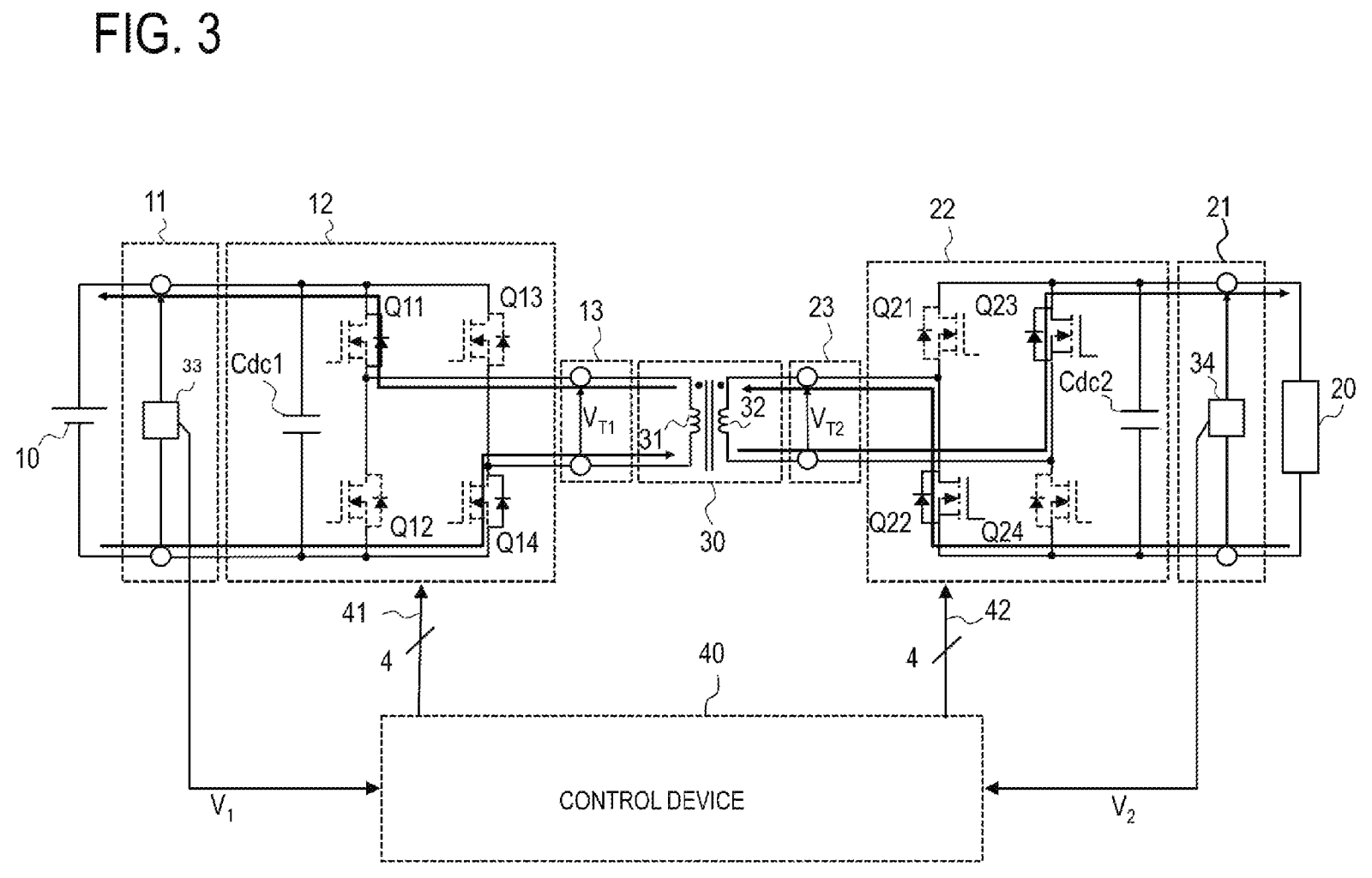

FIG. 3 shows the state of the semiconductor switching elements Q11-Q24 and the AC current IL, which are just before the semiconductor switching elements Q11 and Q14 in the first bridge circuit 12 are turned on. It is worth noticing that, in FIG. 3, the semiconductor switching elements Q11, Q12, Q13, Q14, Q21, and Q24, each indicated with a dashed line, show that they are in an OFF state, or elements not carrying an electric current. In addition, the semiconductor switching elements Q22 and Q23, each indicated with a solid line, show that they are in an ON state, or elements carrying an electric current.

Moreover, FIG. 3 shows a state just before the semiconductor switching elements Q11 and Q14 are turned on. Thereby, the first bridge circuit 12 is during a short circuit prevention period, where all of the semiconductor switching elements Q11-Q14 are in an OFF state.

As shown in FIG. 3, when the first bridge circuit 12 is during the short circuit prevention period, a state is established in which the diodes, which are connected in reverse parallel with the semiconductor switching elements Q11 and Q14, are carrying an electric current, and the voltages which are applied to the semiconductor switching elements Q11 and Q14 become zero. At this time, if the semiconductor switching elements Q11 and Q14 are turned on, they will start ZVS motion.

The current which is just before the semiconductor switching elements Q11-Q14 are turned on needs to be a negative value, in order to achieve the ZVS motion inside of the first bridge circuit 12. Therefore, the required condition is to satisfy the following formula: AC current IL0<0. Moreover, when the first bridge circuit 12 is just before the start of a short circuit prevention period, the semiconductor switching elements Q12 and Q13 are turned off, and a state is established in which the diodes which are connected in reverse parallel with the semiconductor switching elements Q11 and Q14 are carrying an electric current. Then, with the start of the short circuit prevention period, the AC voltage VT1 of the first AC terminal 13 switches from negative to positive, in its polarity.

Figure 4:
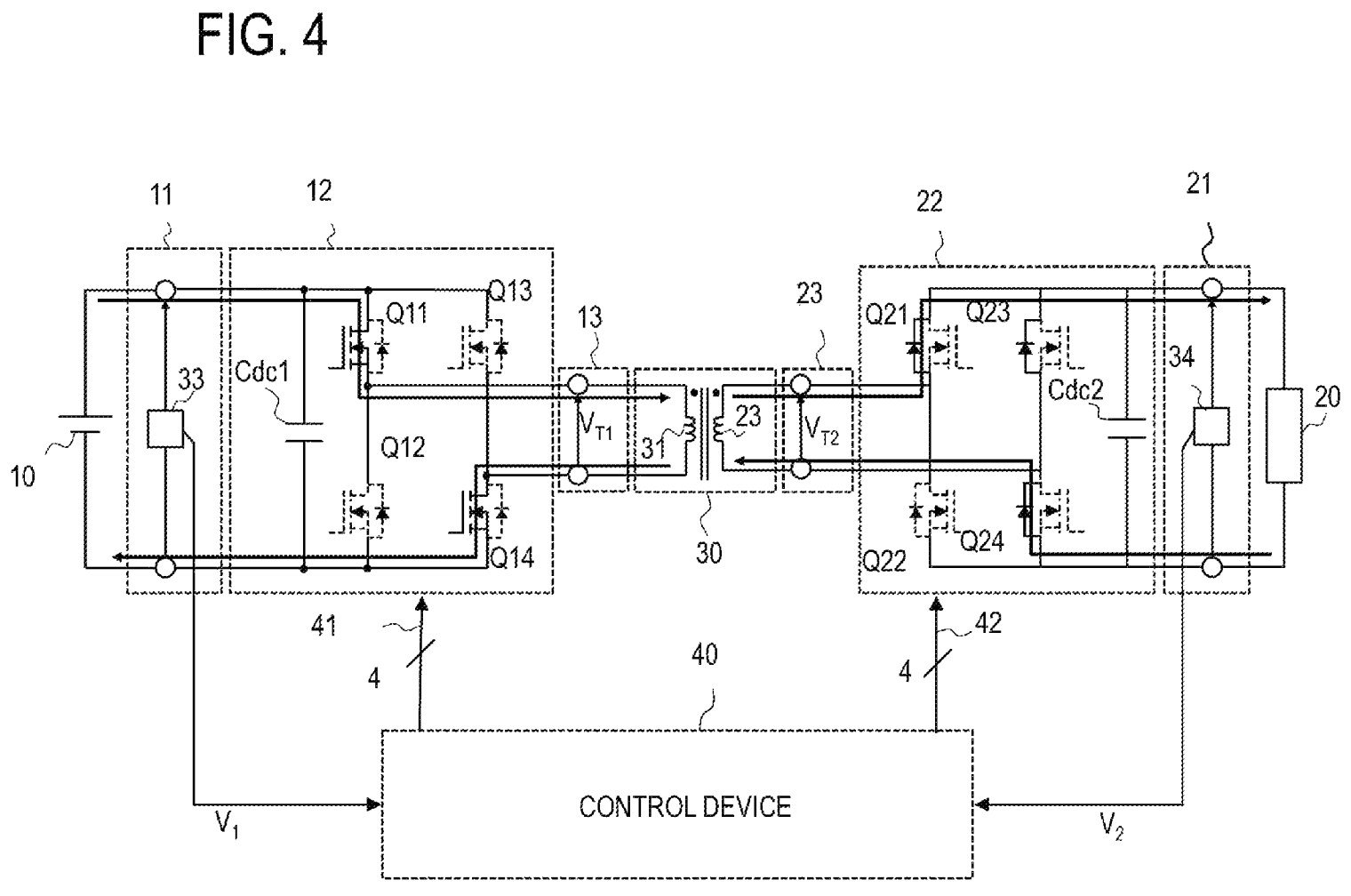

FIG. 4 shows the state of the semiconductor switching elements Q11-Q24 and the AC current IL, which are just before the semiconductor switching elements Q21 to Q24 in the second bridge circuit 22 are turned on. It is worth noticing that, in FIG. 4, the semiconductor switching elements Q12, Q13, Q21, Q22, Q23, and Q24, each indicated with a dashed line, show that they are in an OFF state, or elements not carrying an electric current. In addition, the semiconductor switching elements Q11 and Q14, each indicated with a solid line, show that they are in an ON state, or elements carrying an electric current. Moreover, FIG. 4 shows a state just before the semiconductor switching elements Q21 and Q24 are turned on. Thereby, the second bridge circuit 22 is during a short circuit prevention period, where all of the semiconductor switching elements Q21-Q24 are in an OFF state.

As shown in FIG. 4, when the second bridge circuit 22 is during the short circuit prevention period, a state is established in which the diodes, which are connected in reverse parallel with the semiconductor switching elements Q21 and Q24, are carrying an electric current, and the voltages which are applied to the semiconductor switching elements Q21 and Q24 become zero. At this time, if the semiconductor switching elements Q21 and Q24 are turned on, they will start ZVS motion.

The current which is just before the semiconductor switching elements Q21-Q24 are turned on needs to be a positive value, in order to achieve the ZVS motion in the second bridge circuit 22. Therefore, the required condition is to satisfy the following formula: AC current IL1>0. Moreover, when the second bridge circuit 22 is just before the start of a short circuit prevention period, the semiconductor switching elements Q22 and Q23 are turned off, and a state is established in which the diodes which are connected in reverse parallel with the semiconductor switching elements Q21 and Q24 are carrying an electric current. Then, with the start of a short circuit prevention period, the voltage VT2 of the second AC terminal 23 switches from negative to positive, in the polarity.

With respect to the gate signal 41 of the semiconductor switches Q11-Q14 in the first bridge circuit 12, the gate signal 42 of the semiconductor switches Q21-Q24 in the second bridge circuit 22 will be delayed only by a phase difference φcal (=φref), which is calculated in the phase difference operation part 401. In this way, with the turn off of the semiconductor switching elements Q11-Q24 in the first bridge circuit 12 and the second bridge circuit 22, the AC voltage VT1 and the AC voltage VT2 are switched in the polarity. Then, the phase difference between the AC voltage VT1 and the AC voltage VT2 also becomes φcal.

Figure 5:
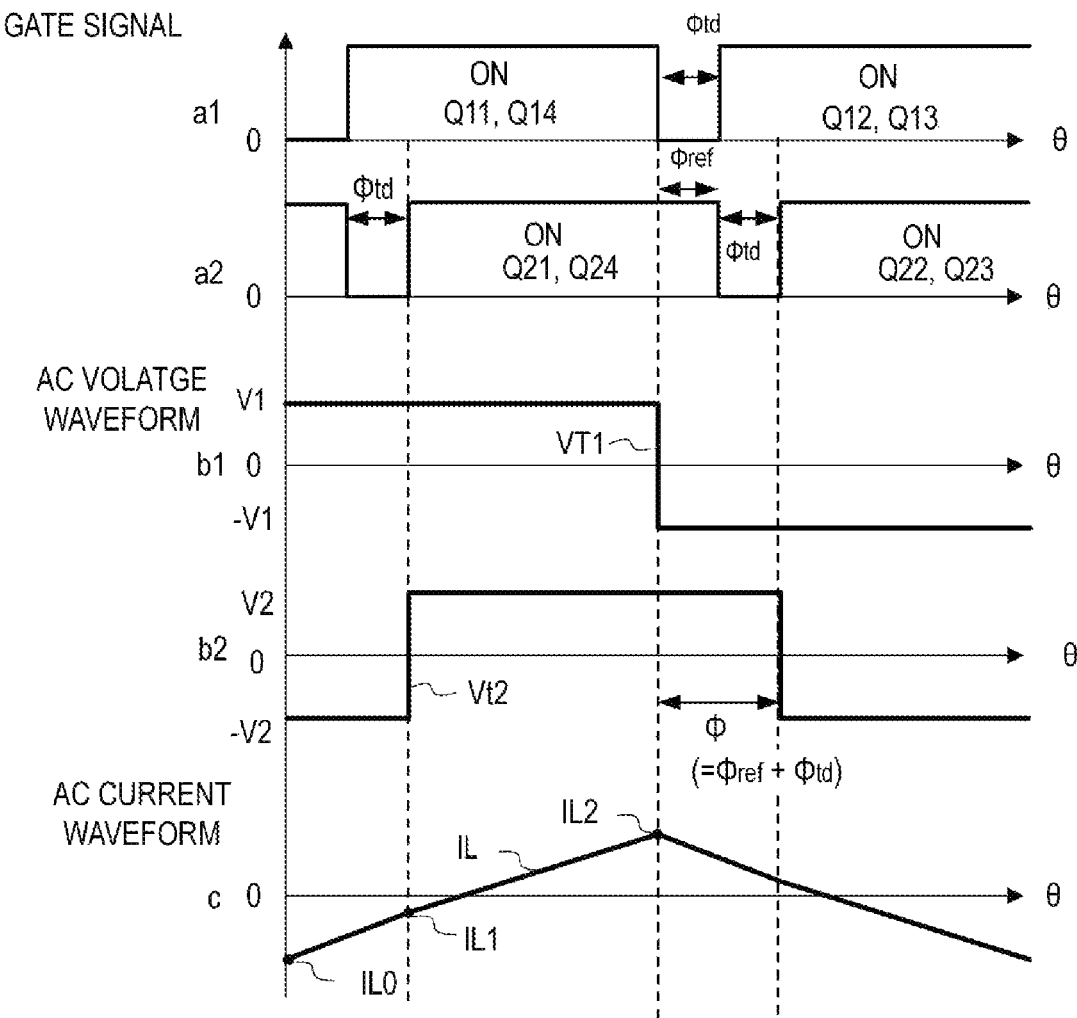
FIG. 5 is a second waveform chart showing an AC current and voltages which are applied to a transformer winding, according to the Embodiment 1.

Next, in FIG. 5, the gate signals of the semiconductor switching elements Q11-Q24 are shown as the signal a1 and the signal a2, in the case where the voltage V1 of the first direct current terminal 11 is large compared with the voltage V2 of the second direct current terminal 21. The waveforms of the AC voltage VT1 and the AC voltage VT2 are shown as the waveform b1 and the waveform b2, where those voltages are output to the primary side winding 31 and the secondary side winding 32 of the transformer 30, from the first bridge circuit 12 and the second bridge circuit 22, and the waveform of the AC current IL is shown as the waveform c.

As shown in FIG. 5, the AC current IL0 is a negative value, which is a current at the moment when the semiconductor switching elements Q11 and Q14 in the first bridge circuit 12 are turned on. Since the state just before the semiconductor switching elements Q11 and Q14 in the first bridge circuit 12 are turned on becomes the same as that of FIG. 3, ZVS motion can be achieved in the first bridge circuit 12. However, the AC current IL1 is a negative value, which is a current at the moment when the semiconductor switching elements Q21 and Q24 in the second bridge circuit 22 are turned on. The state just before the semiconductor switching elements Q21 and Q24 in the second bridge circuit 22 are turned on is different from that of FIG. 4.

Figure 6:
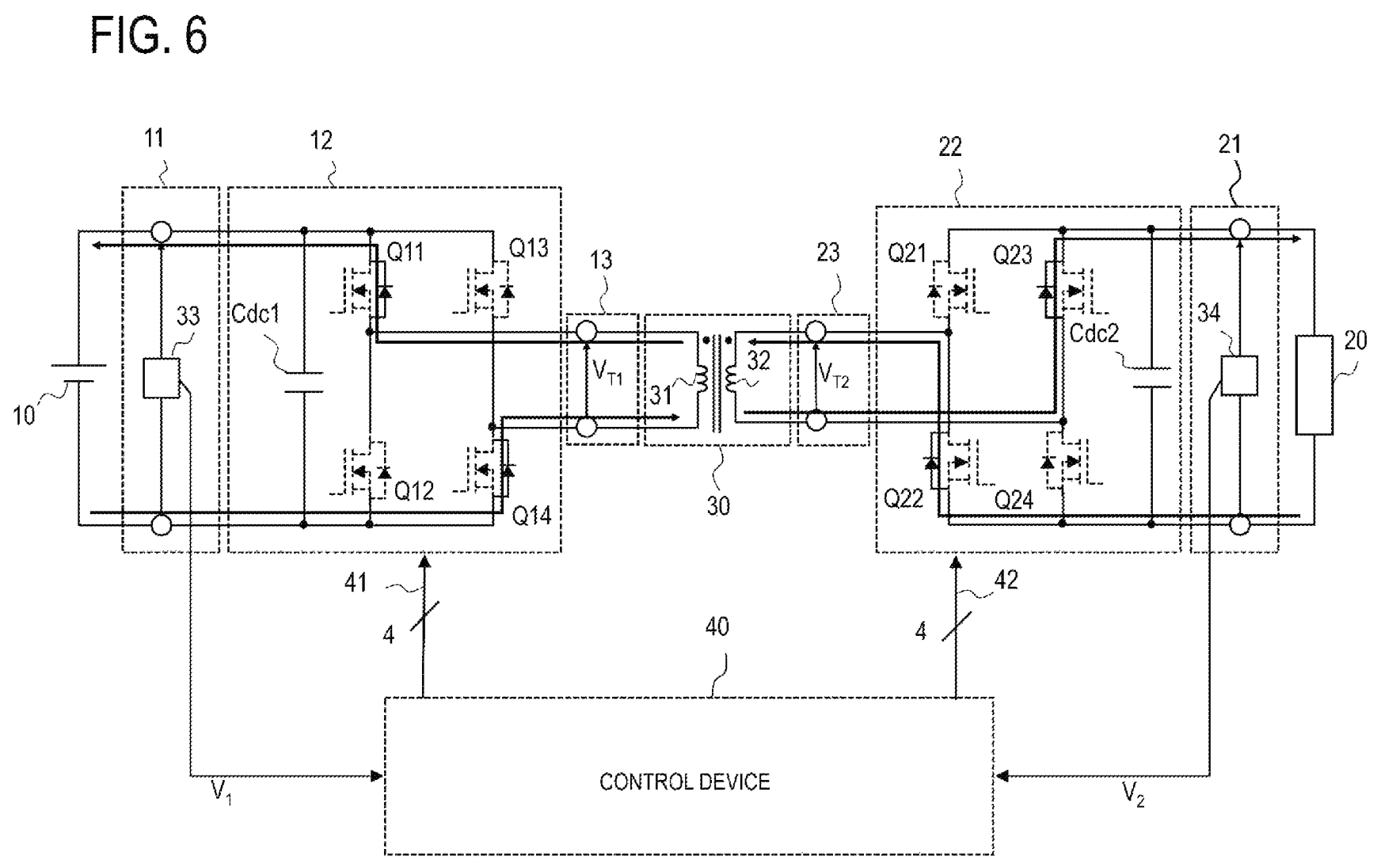

FIG. 6 shows the state of the semiconductor switching elements Q11-Q24 and the AC current IL, which are just before the semiconductor switching elements Q21 and Q24 of the second bridge circuit 22 are turned on, in the case where the voltage V1 of the first direct current terminal 11 is large compared with the voltage V2 of the second direct current terminal 21. It is worth noticing that, in FIG. 6, the semiconductor switching elements, each indicated with a dashed line, show that they are in an OFF state, or elements not carrying an electric current. In addition, the semiconductor switching element, each indicated with a solid line, show that they are in an ON state, or elements carrying an electric current.

As shown in FIG. 6, AC current passes the diodes which are connected in reverse parallel with the semiconductor switching elements Q22 and Q23, even just before the semiconductor switching elements Q21 and Q24 are turned on, because the AC current IL is a negative value. In this state, the polarity of the AC voltage VT2 maintains still the negative one. When the short circuit prevention period ends, the semiconductor switching elements Q21 and Q24 will be turned on, and then, the polarity of the AC voltage VT2 is switched to a positive one.

At this time, the semiconductor switching elements Q21 and Q24 are turned on, while the diodes, which are connected in reverse parallel with the semiconductor switching elements Q22 and Q23, are in a state to carry an electric current. Then, recovery will occur at the diodes which are connected in reverse parallel with the semiconductor switching elements Q22 and Q23.

Furthermore, the polarity of the voltage does not change until a short circuit prevention period ends. Then, the phase difference φ between the AC voltage VT1 and the AC voltage VT2 will become large by a short circuit prevention period φt, with respect to the phase difference φcal, which is calculated in the phase difference operation part 401. Thereby, an error will be caused in the electric power for transmission.

That is, if ZVS motion cannot be attained at the second bridge circuit 22 side, the phase difference φ between the AC voltage VT1 and the AC voltage VT2 will include an error by the short circuit prevention period φtd.

So, the compensation amount operation part 402 calculates a compensation phase difference φcomp, for compensating an error φtd, which is caused in the phase difference φ. In the control device, the compensation phase difference is added to the phase difference φcal, which is calculated in the phase difference operation part 401. And then, the control device calculates a phase difference command value φref to which the compensation phase difference φcomp is added, and inputs it in a PWM signal generation part, and acquires the gate signals 41 and 42. Thereby, electric power P which is in agreement with the command value is transmitted to the load 20.

More specifically, in the phase difference operation part 401, the voltage V1 of the first direct current terminal 11, the voltage V2 of the second direct current terminal 21, and the command value P of electric power to be transmitted with the electric power conversion apparatus 1 are substituted in the Equation (6) or the Equation (7). Thereby, a phase difference φcal is obtained. Here, the phase difference operation part 401 uses the detected voltage V1 of the first direct current terminal 11 and the detected voltage V2 of the second direct current terminal 21, for the calculation of a phase difference. It is worth noticing that a switching frequency fsw and an inductance element L are used for the calculation in the Equation (6) or the Equation (7). However, these values are values which are determined at the design time of the electric power conversion apparatus 1, and design values are input in the control device 40 beforehand.

On the other hand, in the compensation amount operation part 402, the phase difference φcal, which is an output of the phase difference operation part 401, the detected voltage V1 of the first direct current terminal 11, and the detected voltage V2 of the second direct current terminal 21 are substituted in the Equation (2) and the Equation (5), to calculate an AC current IL0. Furthermore, the calculated AC current IL0, the calculated phase difference φcal, the detected voltage V1 of the first direct current terminal 11, and the detected voltage V2 of the second direct current terminal 21 are substituted in the Equation (3) and the Equation (5), to calculate an AC current IL1.

At this time, as mentioned above, if AC current IL1>0, ZVS motion is attained in the second bridge circuit 22, and an error φtd of phase difference associated with a short circuit prevention period will not be caused. Therefore, in the compensation amount operation part 402, if AC current IL1>0, a compensation phase difference φcomp=0 will be output, and if AC current IL1<0, a compensation phase difference φcomp=−φtd will be output.

In the control device 40, the output φcal of the phase difference operation part 401 is added to the compensation phase difference φcomp of the output of the compensation amount operation part 402, to calculate the phase difference command value φref. Then, the phase difference command value φref satisfies the equation φref=φcal−φtd, and can compensate the error of a phase difference which is caused by the short circuit prevention period.

Figure 7:
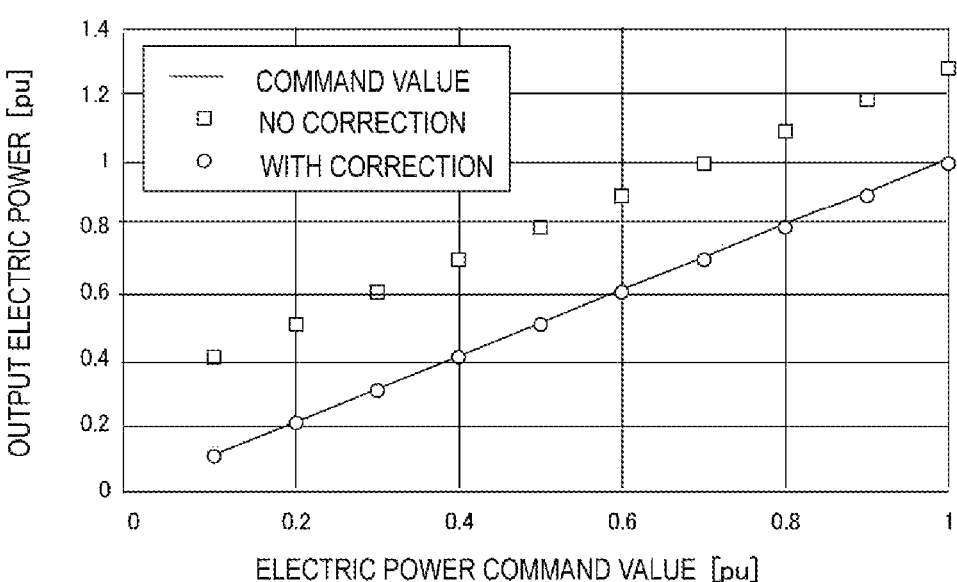
FIG. 7 is a characteristic drawing of the electric power conversion apparatus according to the Embodiment 1.

FIG. 7 shows the comparison of the presence or absence of a compensation amount φcomp, by the compensation amount operation part 402, where the comparison is carried out by simulation. As shown in FIG. 7, it can be confirmed that the electric power which is output from the electric power conversion apparatus 1 is well in agreement with an electric power command value, due to the effect of the compensation amount φcomp, by the compensation amount operation part 402.

According to such a configuration, when the output voltage of the direct current power supply 10 fluctuates without employing the complicated control of electric power, and even when the voltage of the load 20 fluctuates, no error is caused in the electric power which is transmitted to the load 20, and it becomes possible to achieve an electric power conversion apparatus 1 with a high control accuracy.

Embodiment 2

In the Embodiment 1, explanation is made about the case where the voltage V1 of the first direct current terminal 11 becomes large with respect to the voltage V2 of the second direct current terminal 21. In the Embodiment 2, explanation will be made about the case where the voltage V1 of the first direct current terminal 11 becomes small with respect to the voltage V2 of the second direct current terminal 21.

Figure 8:
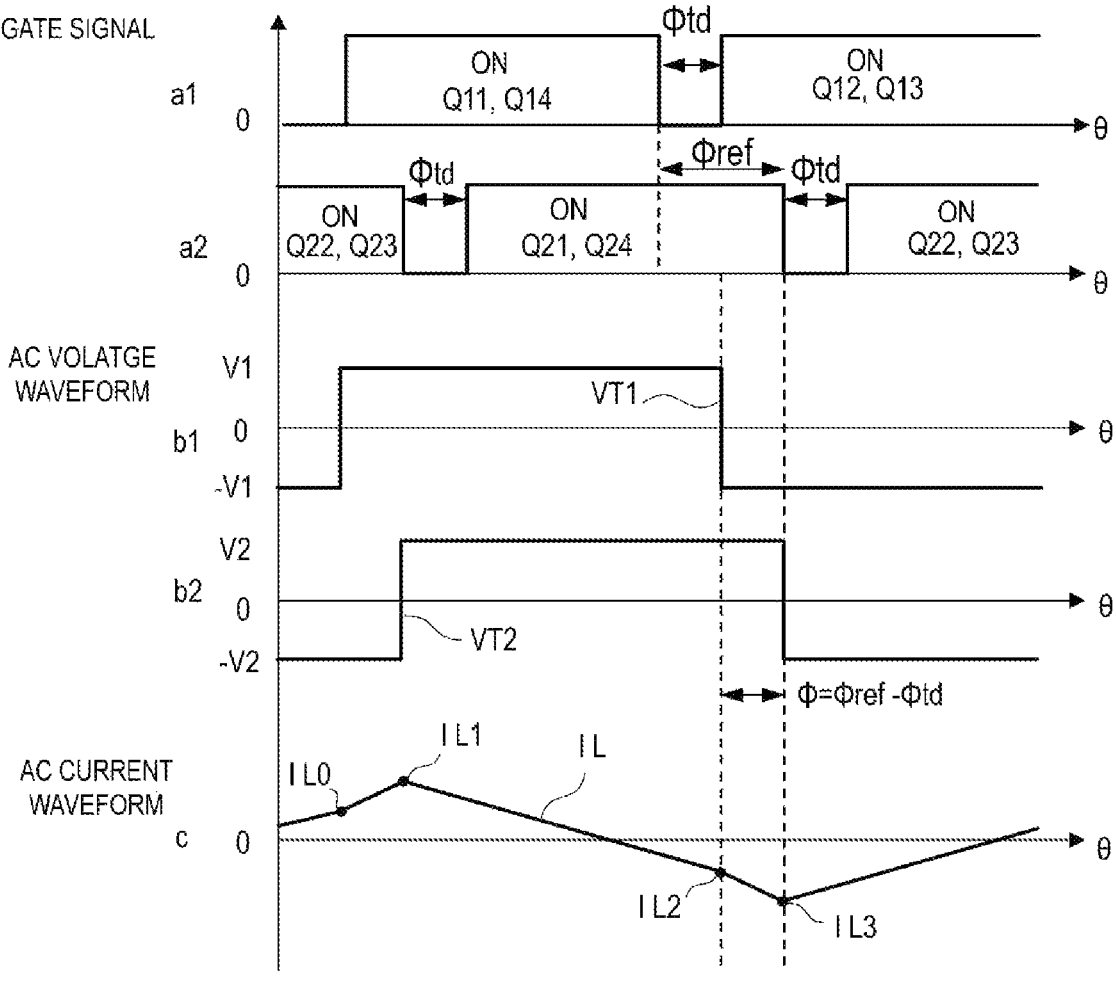
FIG. 8 is a waveform chart showing an AC current and voltages which are applied to a transformer winding, according to the Embodiment 2.

In FIG. 8, the gate signals of the semiconductor switching elements Q11-Q24 are shown as the signal a1 and the signal a2, in the case where the voltage V1 of the first direct current terminal 11 is large compared with the voltage V2 of the second direct current terminal 21. The waveforms of the AC voltage VT1 and the AC voltage VT2 are shown as the waveform b1 and the waveform b2, where those voltages are output to the primary side winding 31 and the secondary side winding 32 of the transformer 30, from the first bridge circuit 12 and the second bridge circuit 22, and the waveform of the AC current IL is shown as the waveform c.

As shown in FIG. 8, the AC current IL1 is a positive value, which is a current at the moment when the semiconductor switching elements Q21 and Q24 in the second bridge circuit 22 are turned on. Then, the state which is just before the semiconductor switching elements Q21 and Q24 in the second bridge circuit 22 are turned on is the same as that of FIG. 4, and ZVS motion is attained in the second bridge circuit 22. However, the AC current IL0 is a positive value, which is a current at the moment when the semiconductor switching elements Q11 and Q14 in the first bridge circuit 12 are turned on. Then, the state which is just before the semiconductor switching elements Q11 and Q14 in the first bridge circuit 12 are turned on is different from that of the FIG. 3.

Figure 9:
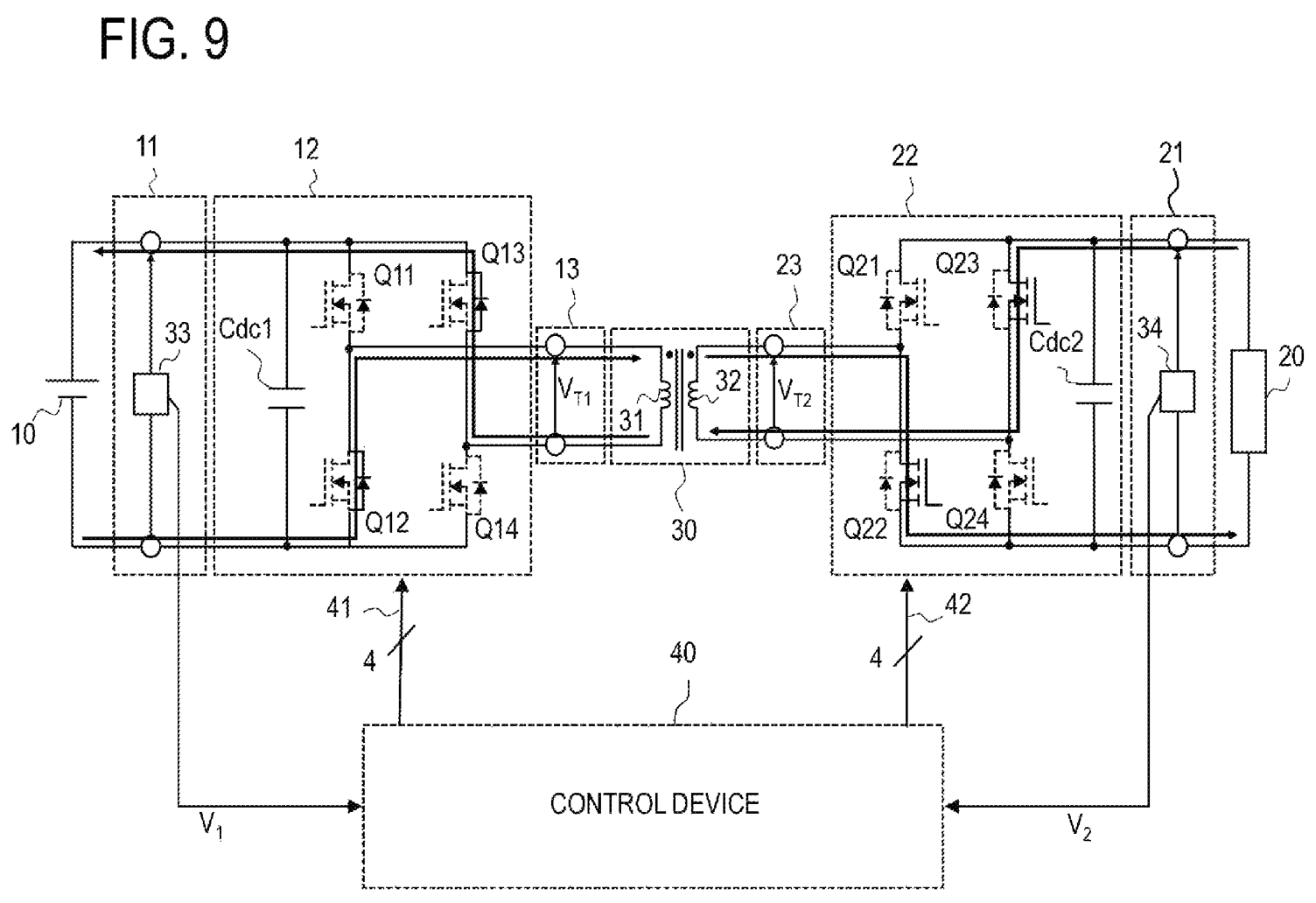

In FIG. 9, shown are the state of the semiconductor switching elements Q11-Q24 and the AC current IL, which are just before the semiconductor switching elements Q11 and Q14 of the first bridge circuit 12 are turned on, in the case where the voltage V1 of the first direct current terminal 11 is small compared with the voltage V2 of the second direct current terminal 21. It is worth noticing that, in FIG. 9, the semiconductor switching elements, each indicated with a dashed line, show that they are in an OFF state, or elements carrying an electric current. In addition, the semiconductor switching elements, each indicated with a solid line, show that they are in an ON state, or elements carrying an electric current.

As shown in FIG. 9, current passes through the diodes which are connected in reverse parallel with the semiconductor switching elements Q12 and Q13, even just before the semiconductor switching elements Q11 and Q14 are turned on, since the AC current IL is a positive value. In this state, the polarity of the AC voltage VT1 remains still negative. If a short circuit prevention period ends, the polarity of the AC voltage VT1 switches to a positive value, since the semiconductor switching elements Q11 and Q14 are turned on. At this time, the semiconductor switching elements Q11 and Q14 are turned on, in the state where the diodes connected in reverse parallel with the semiconductor switching elements Q12 and Q13 are carrying an electric current. Then, recovery will occur in the diodes which are connected in reverse parallel with the semiconductor switching elements Q12 and Q13.

Furthermore, the polarity of the voltage does not change until a short circuit prevention period ends. Then, the phase difference φ between the AC voltage VT1 and the AC voltage VT2 will become small by the short circuit prevention period φtd, with respect to the phase difference φcal, which is calculated in the phase difference operation part 401. Thereby, an error will be caused in the electric power for transmission.

That is, if ZVS motion cannot be attained at the first bridge circuit 12 side, the phase difference φ between the AC voltage VT1 and the AC voltage VT2 will include an error by the short circuit prevention period φtd.

So, the compensation amount operation part 402 calculates a phase difference φcomp, which compensates an error φtd, which is caused in the phase difference φ, and the control device 40 adds it to the phase difference φcal, which is calculated in the phase difference operation part 401. And then, the control device calculates a phase difference command value φref, to which the phase difference φcomp is added, and inputs it in a PWM signal generation part, and acquires the gate signals 41 and 42. Thereby, the control device transmits the electric power P which is in agreement with the command value to the load 20.

More specifically, in the phase difference operation part 401, the voltage V1 of the first direct current terminal 11, the voltage V2 of the second direct current terminal 21, and the command value P of electric power to be transmitted with the electric power conversion apparatus 1 are substituted in the Equation (6) or the Equation (7). Thereby, the control device obtains the phase difference φcal. Here, the phase difference operation part 401 uses the detected voltage V1 of the first direct current terminal 11 and the detected voltage V2 of the second direct current terminal 21, for the calculation of a phase difference.

It is worth noticing that a switching frequency fsw and an inductance element L are used for the operation of the Equation (6) or the Equation (7). These values are values which are determined at the design time of the electric power conversion apparatus 1, and design values are input in the control device 40 beforehand.

On the other hand, in the compensation amount operation part 402, the phase difference φcal, which is an output of the phase difference operation part 401, the detected voltage V1 of the first direct current terminal 11, and the detected voltage V2 of the second direct current terminal 21 are substituted in the Equation (2) and the Equation (5), to calculate an AC current IL0. As mentioned above, if the AC current IL0<0, ZVS motion is attained in the first bridge circuit 12, and an error φtd of the phase difference associated with a short circuit prevention period will not be caused. Therefore, in the compensation amount operation part 402, when the AC current IL0<0, the compensation phase difference φcomp=0 will be output, and when the AC current IL0>0, the compensation phase difference φcomp=φtd will be output.

In the control device 40, the output φcal of the phase difference operation part 401 is added to the compensation phase difference φcomp of the output of the compensation amount operation part 402, to calculate a phase difference command value φref. Then, the phase difference command value φref satisfies the equation φref (phase difference command value)=φcal+φtd, and can compensate the error of the phase difference which is caused by the short circuit prevention period.

Figure 10:
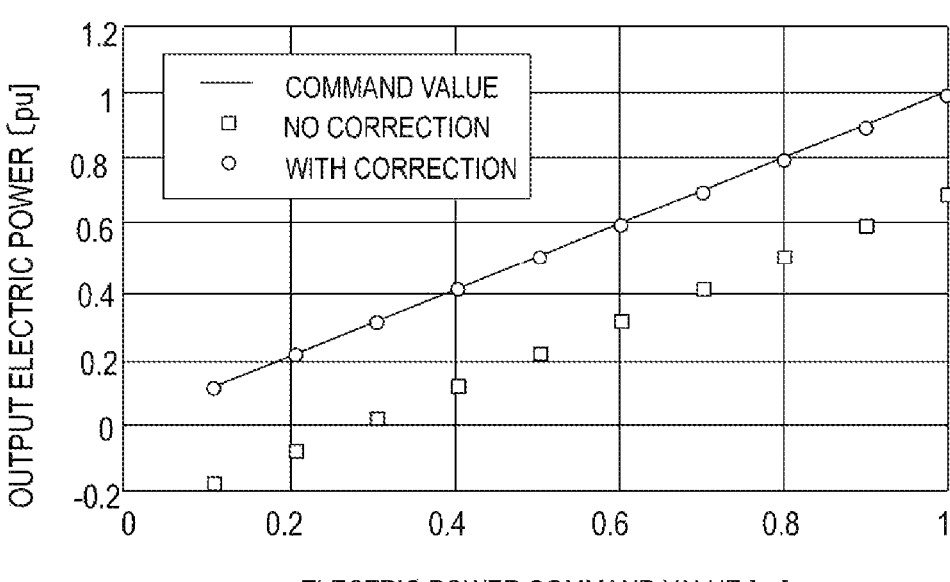
FIG. 10 is a characteristic drawing of the electric power conversion apparatus according to the Embodiment 2.
Figure 11:
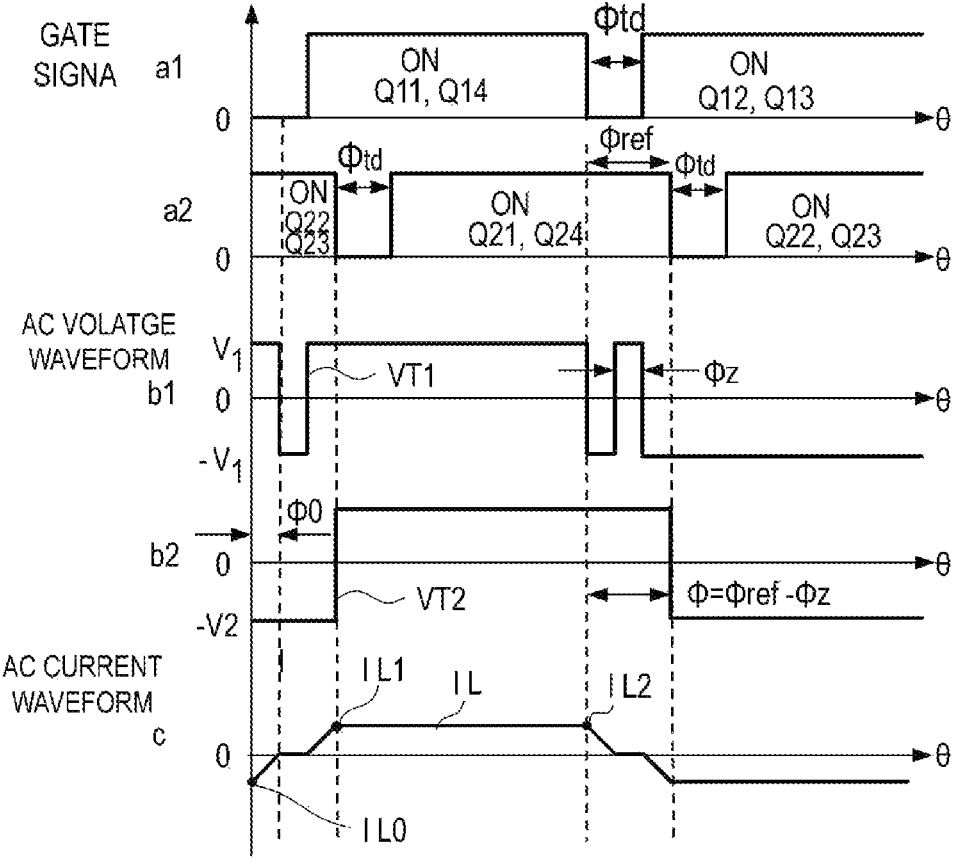
FIG. 11 is a waveform chart showing an AC current and voltages which are applied to a transformer winding according to the Embodiment 3.

FIG. 10 shows the comparison of the presence or absence of a compensation amount φcomp, by the compensation amount operation part 402, where the comparison is carried out by simulation. As shown in FIG. 11, it can be confirmed that the electric power which is output from the electric power conversion apparatus 1 is well in agreement with an electric power command value, due to the effect of the compensation amount φcomp, by the compensation amount operation part 402.

According to such a configuration, when the output voltage of the direct current power supply 10 fluctuates without employing the complicated control of electric power, and even when the voltage of the load 20 fluctuates, no error is caused in the electric power which is transmitted to the load

20, and it becomes possible to achieve an electric power conversion apparatus 1 with a high control accuracy.

It is worth noticing that, under such an operation situation, when ZVS motion is not attained in the second side bridge circuit, the phase difference φ becomes large by φtd, due to the influence of the short circuit prevention period φtd, as mentioned above. Therefore, since the ZVS motion of the first bridge circuit 12 is not attained, the phase difference φ becomes short by the short circuit prevention period φtd. In addition, since the ZVS motion in the second bridge circuit 22 is not attained, the phase difference φ becomes long by the short circuit prevention period φtd.

In this case, those effects cancel each other and the influence of the short circuit prevention period φtd disappears. Then, the output φcomp of the compensation amount operation part 402 satisfies the equation φcomp (output)=0.

Embodiment 3

In the Embodiment 2, explanation is made about the case where the voltage V1 of the first direct current terminal 11 becomes small with respect to the voltage V2 of the second direct current terminal 21. In the Embodiment 3, a case will be explained where the electric power which the electric power conversion apparatus 1 transmits to the load 20 is small.

In FIG. 11, the gate signals of the semiconductor switching elements to Q24 are shown as the waveform a1 and the waveform a2, in the case where the electric power which is transmitted from the first direct current terminal 11 to the second direct current terminal 21 is small. The waveforms of the AC voltage VT1 and the AC voltage VT2 are shown as the waveform b1 and the waveform b2, where those voltages are output to the primary side winding 31 and the secondary side winding 32 of the transformer 30, from the first bridge circuit 12 and the second bridge circuit 22, and the waveform of the AC current IL is shown as the waveform c.

As shown in FIG. 11, the AC current IL0 is a negative value, which is a current at the moment when the semiconductor switching elements Q11 and Q14 in the first bridge circuit 12 are turned on. Then, the state which is just before the semiconductor switching elements Q11 and Q14 in the first bridge circuit 12 are turned on is the same as that of FIG. 4. On the other hand, the AC current IL1 is a positive value, which is a current at the moment when the semiconductor switching elements Q21 and Q24 in the second bridge circuit 22 are turned on. Then, the state which is just before the semiconductor switching elements Q21 and Q24 in the second bridge circuit 22 are turned on is the same as that of FIG. 4. Therefore, in this case, ZVS motion is attained in the first bridge circuit 12 and the second bridge circuit 22, and no error will be caused in the phase difference between the AC voltage VT1 and the AC voltage VT2.

However, as shown in FIG. 11, the AC current IL has a period φZ, during which current becomes zero when polarity switches. Since this period does not to contribute to the transmission of electric power, the phase difference φ becomes small by a period φZ, from the command value φref. As a result, an error will be caused in the electric power which is transmitted to the load 20. Moreover, this period occurs when the first bridge circuit 12 is during the short circuit prevention period, and the AC current IL is zero. Thereby, the polarity of the AC voltage VT1 will be in agreement with that of the AC voltage VT2.

This period φZ will occur, from the moment when the AC current IL is IL0, till the moment when the AC current becomes IL1. Therefore, the relation of the Equation (8) will be established from the Equation (2) and the Equation (5), where the phase at the moment when the equation: AC current IL=0 is satisfied, during a period from the moment when the AC current IL is IL0, till when the AC current becomes IL1 is defined as phase φ0.

[Eq. 8]

Eq. 8

$$I_{L0} + A\phi_0 = 0 \tag{8}$$

Here, by transforming the Equation (8), the phase φ0 at the moment when the equation: AC current IL=0 is satisfied can be obtained, as shown in the Equation (9).

[Eq. 9]

Eq. 9

$$\phi_0 = -\frac{I_{L0}}{A} \tag{9}$$

As shown in FIG. 11, after the elapse of a period φ0, the period φZ starts in the process where the polarity of the AC voltage VT1 is switched and the AC current changes from IL0 to IL1. During the period φZ, the AC current IL becomes zero.

And then, when the short circuit prevention period φtd in the first bridge circuit 12 ends, the polarity of the AC voltage VT1 returns to the polarity which is before the start of the period φZ. In light of the return of polarity, the period φZ, which does not contribute to the transmission of electric power, can be obtained by the following Equation (10).

[Eq. 10]

Eq. 10

$$\phi_Z = \phi_{td} - \phi_0 \tag{10}$$

Therefore, in the control device 40, the phase difference operation part 401 substitutes the voltage V1 of the first direct current terminal 11, the voltage V2 of the second direct current terminal 21, and the command value P of electric power which is transmitted with the electric power conversion apparatus 1, in the Equation (6) or the Equation (7), to calculate a phase difference φcal, and outputs it. In addition, the compensation amount operation part 402 calculates the compensation phase difference φcomp, based on the Equation (10). After the result is output, the compensation phase difference is added to the phase difference φcal. Thereby, the phase difference command value φref, which does not cause an error in the electric power transmitted to the load 20, can be obtained. It is worth noticing that, in the case of period φZ>0 in the Equation (10), the period during which AC current IL=0 is satisfied occurs, and an error is caused in the electric power. Then, in the case of period φZ<0, the output of the compensation amount operation part 402 becomes φcomp=0.

According to such a configuration, when the output voltage of the direct current power supply 10 fluctuates without employing the complicated control of electric power, and even when the voltage of the load 20 fluctuates, no error will be caused in the electric power which is transmitted to the load 20, and it becomes possible to achieve an electric power conversion apparatus 1 with a high control accuracy.

Figure 12:
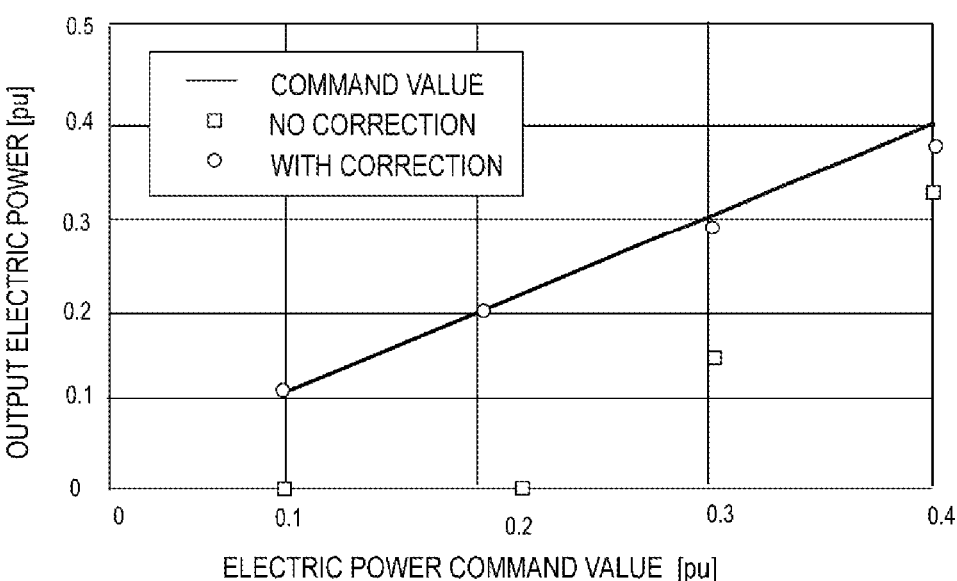
FIG. 12 is a characteristic drawing of the electric power conversion apparatus according to the Embodiment 3.

FIG. 12 shows the comparison of the presence or absence of a compensation amount φcomp, by the compensation amount operation part 402, where the comparison is carried out by simulation. As shown in FIG. 12, it can be confirmed that, in the case where an electric power command value is small, the electric power which is output from the electric power conversion apparatus 1 is well in agreement with an electric power command value, due to the effect of the compensation amount φcomp, by the compensation amount operation part 402.

According to such a configuration, no error will be caused in the electric power which is transmitted to the load 20, and it becomes possible to achieve an electric power conversion apparatus 1 with a high control accuracy.

Embodiment 4

In the Embodiment 3, explanation is made about a case where the electric power which the electric power conversion apparatus 1 transmits to the load 20 is small. However, in fact, the state of the load 20 is always changing, and the state of the direct current power supply 10 is also always changing. Therefore, the compensation amount operation part 402 needs to output a compensation amount of phase difference φcomp, according to the state. In the Embodiment 4, the configuration of the control device 40 will be explained, in which the compensation amount of a phase difference φcomp is calculated in the compensation amount operation part 402, according to the state of the load 20 and the direct current power supply 10.

Figure 13:
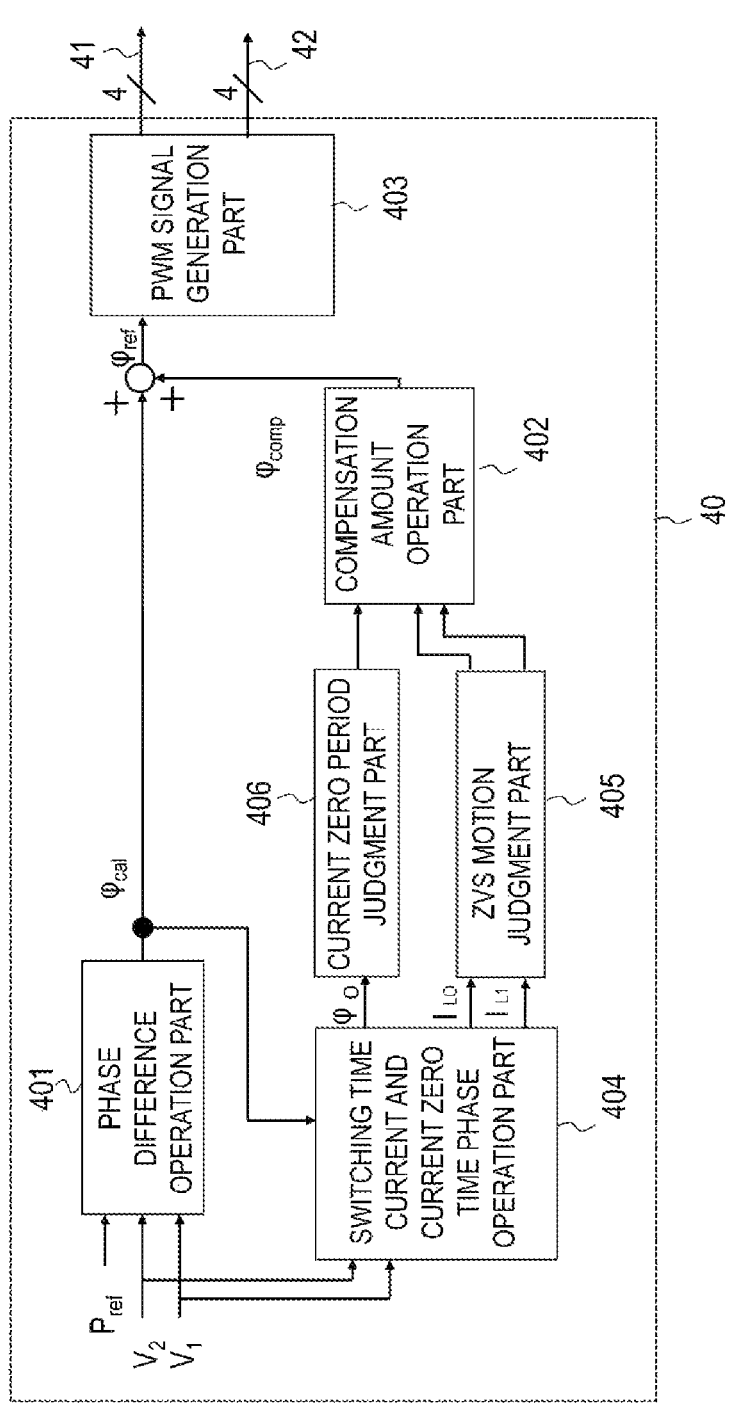
FIG. 13 is a diagram for showing the configuration of a control device according to the Embodiment 4.

The configuration of the control device 40 in accordance with the Embodiment 4 is shown in FIG. 13. The control device 40 according to the Embodiment 4 includes a switching time current and current zero time phase operation part 404, a ZVS motion judgment part 405 and a current zero period judgment part 406, in addition to the configuration of the control device 40 in the Embodiments 1-3. The switching time current and current zero time phase operation part 404 calculates an AC current IL0, an AC current IL1 and a phase φ0, from the detection value of the voltage V1 of the first direct current terminal 11, the detection value of the voltage V2 of the second direct current terminal 21, and the output of the phase difference operation part 401. The ZVS motion judgment part 405 judges the ZVS motion in the first bridge circuit 12 and the second bridge circuit 22, from the operation result of the switching time current and current zero time phase operation part 404. The current zero period judgment part 406 judges whether or not the period during which the AC current IL becomes zero occurs.

In the switching time current and current zero time phase operation part 404, an AC current IL0 and an AC current IL1 are calculated using the Equation (2), the Equation (3), and the Equation (5), and further, a phase φ0 is calculated using the Equation (8) and the Equation (9). And then, the current IL0 and the AC current IL1 are input into the ZVS motion judgment part 405. If IL0<0, it will be judged that ZVS motion is attained in the first bridge circuit 12, and similarly, if IL1>0, it will be judged that ZVS motion is attained in the second bridge circuit 22.

These judgment results are transmitted to the compensation amount operation part 402. Moreover, the current zero period judgment part 406 receives the phase φ0, and compares it with the short circuit prevention period φtd. If the formula: φ0<φtd is satisfied, the current zero period judgment part will judge that the period φZ during which the AC current IL becomes zero is occurring. In addition, if the formula: $\varphi 0 > \varphi td$ is satisfied, the current zero period judgment part will judge that the period $\varphi Z$ during which the AC current IL becomes zero, is not occurring. This judgment result is transmitted to the compensation amount operation part 402.

In the compensation amount operation part 402, which receives the judgment results of the ZVS motion judgment part 405 and the current zero period judgment part 406, the compensation amount of phase difference $\varphi comp$ is calculated based on the judgment results. For example, when the ZVS motion judgment part 405 acknowledges IL0>0 and IL1>0, the judgement result that ZVS motion is not attained in the first bridge circuit 12, but ZVS motion in the second bridge circuit 22 is attained is transmitted to the compensation amount operation part 402.

In such a case, a reversal of current polarities does not occur in the process where the AC current changes from IL0 to IL1, and then, the period during which the AC current IL becomes zero does not occur. Therefore, the current zero period judgment part 406 acknowledges $\varphi 0 > \varphi td$, and judges that the period $\varphi Z$ during which the AC current IL becomes zero does not occur.

In response to these results, the compensation amount operation part 402 outputs a compensation phase difference $\varphi comp = +\varphi td$.

Figure 14:
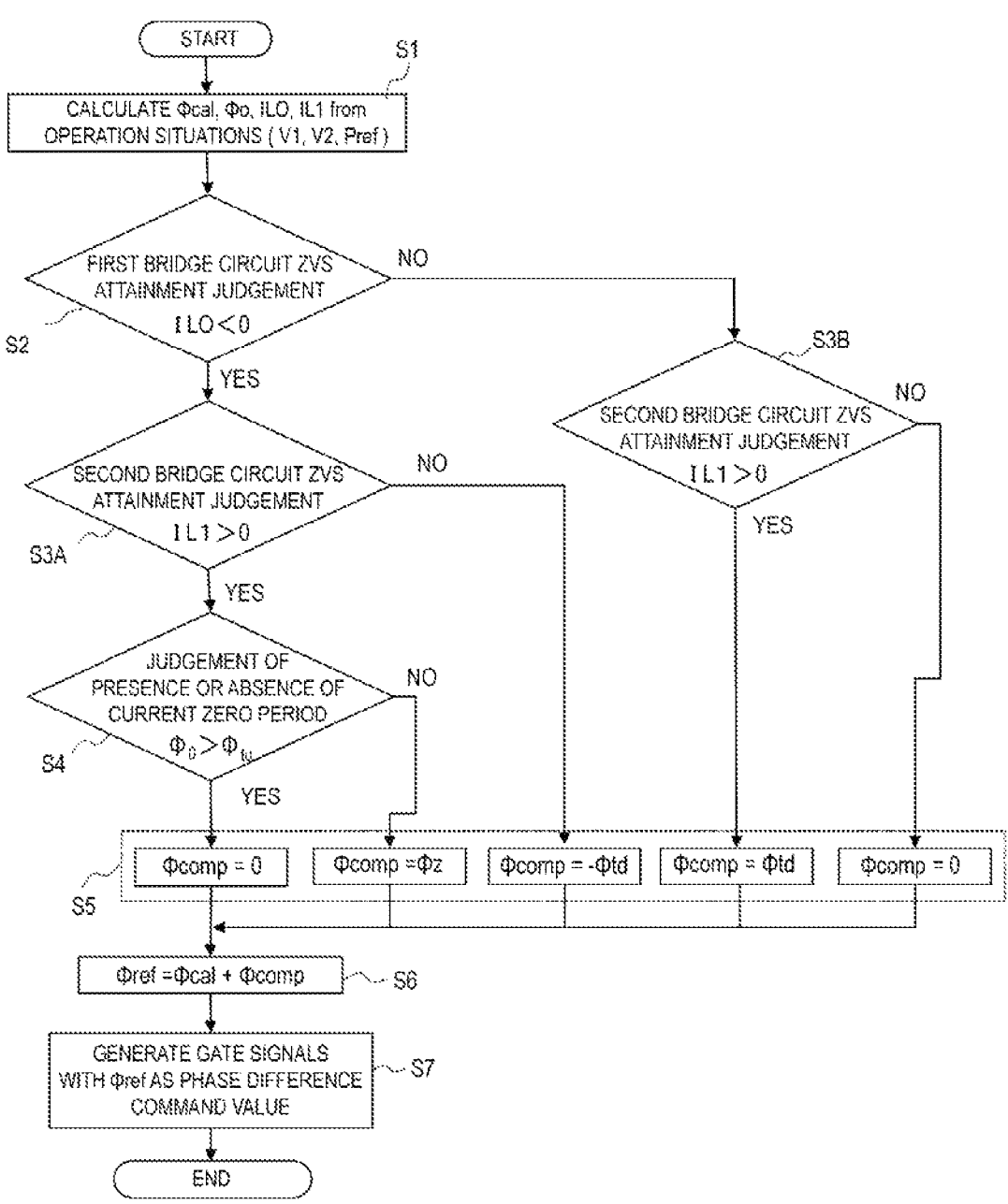
FIG. 14 is a flow chart for explaining operations of the control device according to the Embodiment 4.

The flow chart of the control device 40 is shown in FIG. 14.

In the control device 40, at first, the switching time current and current zero time phase operation part 404 calculates an AC current IL0 and an AC current IL1, from the detection value of the voltage V1 of the first direct current terminal 11, the detection value of the voltage V2 of the second direct current terminal 21, the electric power command P ref, the switching frequency fsw, and the inductance L of inductance elements. In addition, a phase difference $\varphi cal$ is calculated in the phase difference operation part 401 (Step S1).

Next, in the ZVS motion judgment part 405, it is judged, from the polarity of IL0, whether the ZVS motion is attained in the first bridge circuit 12 (Step S2). At this time, when the ZVS motion is attained (IL0<0) in the first bridge circuit 12 (YES), the Process proceeds to Step S3A, and when the ZVS motion is not attained (IL0>0) in the first bridge circuit 12 (NO), the Process proceeds to Step S3B.

Next, at Step S3A, in the ZVS motion judgment part 405, it is judged whether the ZVS motion is attained in the second bridge circuit 22, from the polarity of IL1, and if the ZVS motion is attained in the second bridge circuit 22 (YES), the Process proceeds to Step S4. On the other hand, if the ZVS motion is not attained in the second bridge circuit 22 (NO), a compensation phase difference $\varphi comp = -\varphi td$ is output in the compensation amount operation part 402 (Step S5).

Similarly, also at Step S3B, it is judged, in the ZVS motion judgment part 405, whether the ZVS motion is attained in the second bridge circuit 22, from the polarity of IL1. If the ZVS motion is attained in the second bridge circuit 22 (YES), a compensation phase difference $\varphi comp = \varphi td$ is output in the compensation amount operation part 402 (Step S5), and if the ZVS motion is not attained (NO) in the second bridge circuit 22, a compensation phase difference $\varphi comp = 0$ is output in the compensation amount operation part 402 (Step S5).

Next, at Step S4, the current zero period judgment part 406 judges the presence or absence of a period during which the AC current IL becomes zero. If there is a period during which the AC current becomes zero (YES), a compensation phase difference $\varphi comp = 0$ is output in the compensation amount operation part 402 (Step S5), and if there is not a period during which the AC current becomes zero (NO), a compensation phase difference $\varphi comp = \varphi Z$ is output in the compensation amount operation part 402 (Step S5).

Next, at Step S6, a phase difference command value $\varphi ref$ is calculated by adding the compensation amount $\varphi comp$, which is calculated in the compensation amount operation part 402, to the phase difference $\varphi cal$.

Next, the phase difference command value $\varphi ref$ is input in the PWM signal generation part 403, and the gate signals 41 and 42 are generated (Step S7).

Henceforth, as long as the electric power conversion apparatus 1 is operating, Steps S1-S7 will be repeated.

According to such a configuration, it becomes possible to achieve an electric power conversion apparatus with a high control accuracy, without the influence of a short circuit prevention period, about the case where the voltage V1 of the first direct current terminal 11, the voltage V2 of the second direct current terminal 21, or the command value P ref of transmission electric power fluctuates without employing the complicated control of electric power.

Embodiment 5

So far, explanation is made about the method for judging the presence or absence of the influence of a short circuit prevention period, where the AC current IL is calculated from operation conditions in the control device 40. In the Embodiment 5, a configuration for compensating the influence of a short circuit prevention period will be explained, where the control device detects an AC current IL, and judges whether or not the ZVS motion is attained in the first bridge circuit 12 and the second bridge circuit 22.

Figure 15:
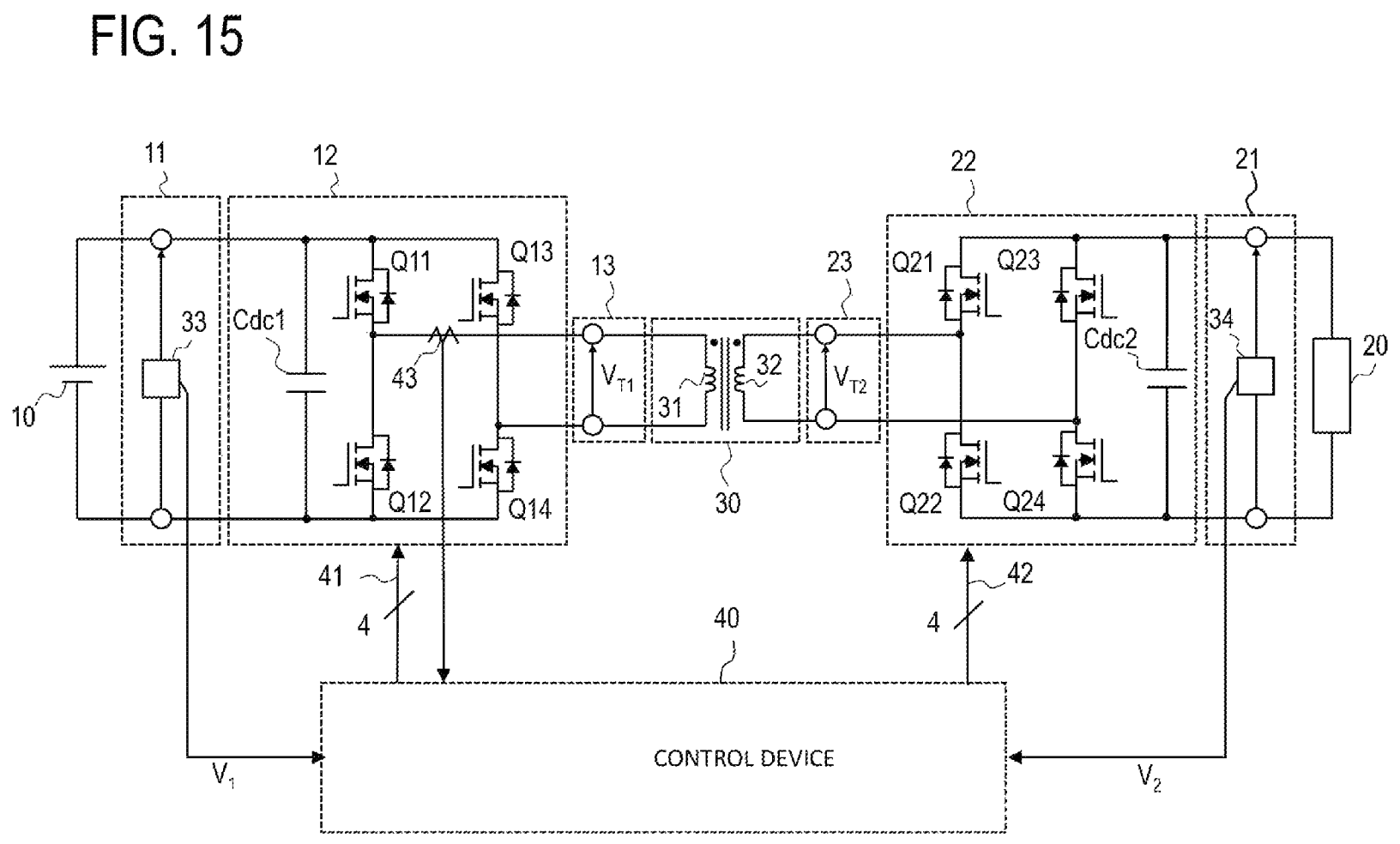

FIG. 15 shows the electric power conversion apparatus 1 which is equipped with current detection means 43. In FIG. 15, the current detection means 43 is arranged in the first bridge circuit 12, but the position of arrangement is not limited to this one. In some embodiments, the current detection means may be arranged in the second bridge circuit 22, or may be arranged in both of the first bridge circuit 12 and the second bridge circuit 22.

Figure 16:
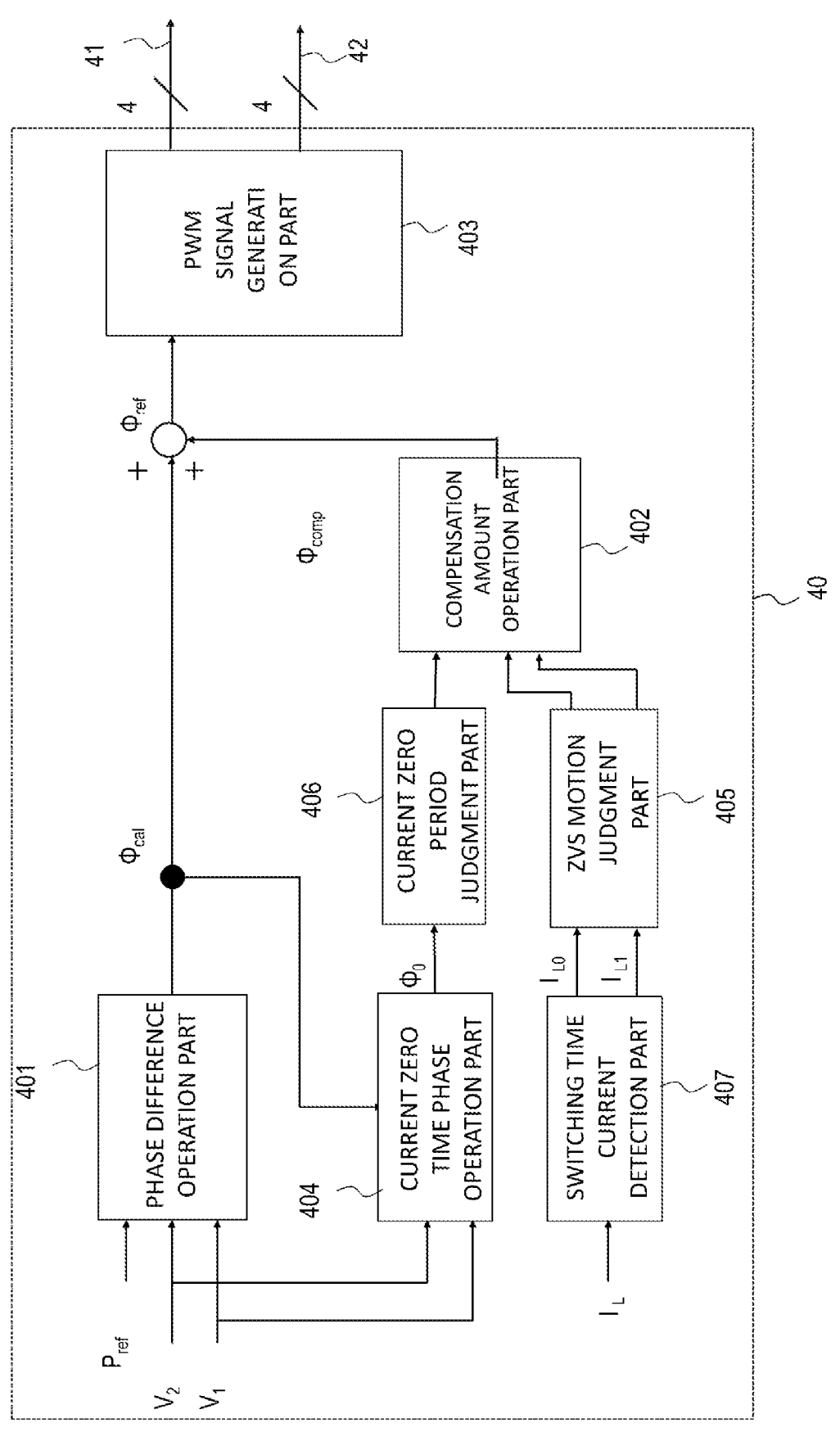
FIG. 16 is a configuration diagram of the control device according to the Embodiment 5.

FIG. 16 shows the configuration of the control device 40, in the case where the electric power conversion apparatus 1 is equipped with the current detection means 43. The control device 40 is equipped with a switching time current detection part 407, which detects a current at the switching time in the first bridge circuit 12 and the second bridge circuit 22, from the AC current IL detected by the current detection means 43.

The switching time current detection part 407 detects an AC current IL0, which is at the turn on time of the semiconductor switching elements Q11 and Q14 in the first bridge circuit 12, and transmits it to the ZVS motion judgment part 405. Moreover, the switching time current detection part 407 detects a current IL2, which is at the turn off time of the semiconductor switching elements Q11 and Q14 in the first bridge circuit 12, and transmits it to the ZVS motion judgment part 405. In both cases, the ZVS motion judgment part can judge whether or not the ZVS motion in the first bridge circuit 12 is attained. This is because the integration value of AC current IL over one cycle becomes zero, and the AC current IL2 is reversed in the polarity to the AC current IL0, and its absolute value is the same with that of the AC current IL0.

Furthermore, the switching time current detection part 407 detects a current IL1, which is at the turn on time of the semiconductor switching elements Q21 and Q24 in the second bridge circuit 22, and transmits it to the ZVS motion judgment part 405. Moreover, the switching time current detection part 407 detects a current, which is at the turn off time of the semiconductor switching elements Q21 and Q24 in the second bridge circuit 22, and transmits it to the ZVS motion judgment part 405. In both cases, the switching time current detection part can judge whether or not the ZVS motion in the second bridge circuit 22 is attained.

According to such a configuration, it becomes unnecessary to calculate the currents IL0 and IL1 from the operation situation of the electric power conversion apparatus 1, and then, the control device 40 can have a simple configuration. Moreover, errors due to the operation do not occur, and then, it becomes possible to perform control with a higher precision.

Figure 17:
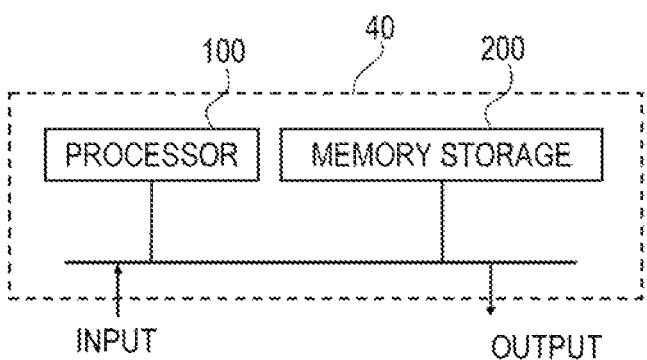
FIG. 17 is a hardware configuration diagram of the control device.

It is worth noticing that, an example of the hardware in the control device according to the present application is shown in FIG. 17. The electric power conversion apparatus consists of a processor 100 and a memory storage 200, and the memory storage 200 possesses volatile memory storages, such as random access memory, and non-volatile auxiliary memory storages, such as flash memory, although they are not illustrated. Moreover, the memory storage may possess auxiliary memory storages of hard disk type, instead of flash memory.

The processor 100 executes programs input from the memory storage 200, and performs, for example, communications between the local server 5 and the local network base station 6, from the communication terminal 81. In this case, the program is input into the processor 100 through volatile memory storages from auxiliary memory storages. Moreover, the processor 100 may output the data of an operation result and others to the volatile memory storages of the memory storage 200, or may save the data in the auxiliary memory storages through volatile memory storages.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Electric Power Conversion Apparatus; 10 Direct Current Power Supply; 11 First DC Terminal; 12 First Bridge Circuit; 13 First AC terminal; 20 Load; 21 Second DC Terminal; 22 Second Bridge Circuit; 23 Second AC terminal; 30 Transformer; 31 Primary Side Winding; 32 Secondary Side Winding; 33 First Voltage Detection Means; 34 Second Voltage Detection Means; 40 Control Device; 41, 42 Gate Signal; 43 Current Detection Means; 100 Processor; 200 Memory Storage; 401 Phase Difference Operation Part; 402 Compensation Amount Operation Part; 403 PWM Signal Generation Part; 404 Current Zero Time Phase Operation Part; 405 ZVS Motion Judgment Part; 406 Current Zero Period Judgment Part; 407 Switching Time Current Detection Part.

What is claimed is:

1. An electric power conversion apparatus, comprising:
a transformer,
a first bridge circuit, having a first semiconductor switching element, connected to a primary side winding of the transformer, and being set up with a short circuit prevention period,
a second bridge circuit, having a second semiconductor switching element, connected to a secondary side winding of the transformer, and being set up with a short circuit prevention period,
a first voltage detector, detecting a first voltage input into the first bridge circuit,
a second voltage detector, detecting a second voltage input into the second bridge circuit, and
a control device, controlling the first semiconductor switching element and the second semiconductor switching element,
wherein the control device comprises:
a phase difference operation part which calculates a phase difference between a first output of the first bridge circuit and a second output of the second bridge circuit, based on a first voltage value detected by the first voltage detector, a second voltage value detected by the second voltage detector, and an electric power command value,
a compensation amount operation part which:
calculates a compensation amount for compensating an error caused in the phase difference, from a first operation result of the phase difference operation part, the first voltage value, and the second voltage value,
calculates currents just before the first semiconductor switching element and the second semiconductor switching element are turned on, based on the phase difference calculated in the phase difference operation part, the first voltage value, and the second voltage value, and
judges whether zero voltage switching (ZVS) motion is attained, in the first bridge circuit and the second bridge circuit, from the currents calculated, and
a PWM signal generation part which generates a first gate signal of the first semiconductor switching element, and a second gate signal of the second semiconductor switching element, from the first operation result of the phase difference operation part and a second operation result of the compensation amount operation part.

2. The electric power conversion apparatus as claimed in claim 1,
wherein the compensation amount operation part calculates the compensation amount, based on the phase difference calculated in the phase difference operation part, the first voltage value, and the second voltage value.

3. The electric power conversion apparatus as claimed in claim 1, wherein, when the ZVS motion is not attained in the bridge circuit at a load side, between the first bridge circuit and the second bridge circuit, the compensation amount operation part outputs a phase amount, which is equivalent to the short circuit prevention period, the phase amount having a reversed polarity, to the phase difference calculated in the phase difference operation part, and wherein, when the ZVS motion is attained in the bridge circuit at the load side, between the first bridge circuit and the second bridge circuit, the compensation amount operation part outputs a phase amount equal to zero.

4. The electric power conversion apparatus as claimed in claim 1, wherein, when the ZVS motion is not attained in the bridge circuit at a power supply side, between the first bridge circuit and the second bridge circuit, the compensation amount operation part outputs a phase amount, which is equivalent to the short circuit prevention period, the phase amount having the same polarity with the phase difference calculated in the phase difference operation part, and wherein, when the ZVS motion is attained in the bridge circuit at the power supply side, between the first bridge circuit and the second bridge circuit, the compensation amount operation part outputs a phase amount equal to zero.

5. The electric power conversion apparatus as claimed in claim 1, wherein the control device comprises:

a switching time current and current zero time phase operation part, which calculates currents just before the first semiconductor switching element and the second semiconductor switching element are turned on, and a period during which an AC current input into the transformer becomes zero, based on the phase difference calculated in the phase difference operation part, the first voltage value, and the second voltage value, a ZVS motion judgment part, which judges whether ZVS motion is attained in the first bridge circuit and the second bridge circuit, based on currents just before the first semiconductor switching element and the second semiconductor switching element are turned on, and a current zero period judgment part, which judges the presence or absence of a period during which the AC current becomes zero, where the switching time current and current zero time phase operation part, the ZVS motion judgment part, and the current zero period judgment part are installed before the compensation amount operation part.

6. The electric power conversion apparatus as claimed in claim 5, wherein the current zero period judgment part performs a judgment whether a period during which an AC current becomes zero occurs, based on a phase which causes the AC current to be zero, the phase calculated in the switching time current and current zero time phase operation part.

7. The electric power conversion apparatus as claimed in claim 5, comprising a current detector to detect an AC current which is input into the transformer, wherein the switching time current and current zero time phase operation part comprises:

a switching time current detector, which detects currents just before the first semiconductor switching element and the second semiconductor switching element are turned on, based on the current detected by the current detector, and a current zero time phase operation part.

8. An electric power conversion apparatus, comprising:

a transformer, a first bridge circuit, having a first semiconductor switching element, connected to a primary side winding of the transformer, and being set up with a short circuit prevention period, a second bridge circuit, having a second semiconductor switching element, connected to a secondary side winding of the transformer, and being set up with a short circuit prevention period, a first voltage detector, detecting a first voltage input into the first bridge circuit, a second voltage detector, detecting a second voltage input into the second bridge circuit, and a control device, controlling the first semiconductor switching element and the second semiconductor switching element, wherein the control device comprises:

a phase difference operation part which calculates a phase difference between a first output of the first bridge circuit and a second output of the second bridge circuit, based on a first voltage value detected by the first voltage detector, a second voltage value detected by the second voltage detector, and an electric power command value, a compensation amount operation part which:

calculates a compensation amount for compensating an error caused in the phase difference, from a first operation result of the phase difference operation part, the first voltage value, and the second voltage value, calculates currents just before the first semiconductor switching element and the second semiconductor switching element are turned on, based on the phase difference calculated in the phase difference operation part, the first voltage value, and the second voltage value, and judges the presence or absence of a period during which an AC current input in the transformer becomes zero, and a PWM signal generation part which generates a first gate signal of the first semiconductor switching element, and a second gate signal of the second semiconductor switching element, from the first operation result of the phase difference operation part and a second operation result of the compensation amount operation part.

9. The electric power conversion apparatus as claimed in claim 8, wherein, when a period during which the AC current becomes zero occurs, the compensation amount operation part outputs a phase amount, which is equivalent to a period during which the AC current becomes zero, the phase amount having the same polarity with the phase difference calculated in the phase difference operation part, and wherein, when a period during which the AC current becomes zero does not occur, the compensation amount operation part calculates to output a phase amount equal to zero.

* * * * *